(12) United States Patent
Akin et al.

(10) Patent No.: US 11,593,623 B2
(45) Date of Patent: Feb. 28, 2023

(54) SPIKING NEURAL NETWORK ACCELERATOR USING EXTERNAL MEMORY

(71) Applicant: Intel Corporation, Santa Clara, CA (US)

(72) Inventors: Berkin Akin, Hillsboro, OR (US); Seth Pugsley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1468 days.

(21) Appl. No.: 15/853,282

(22) Filed: Dec. 22, 2017

(65) Prior Publication Data

US 2019/0042920 A1 Feb. 7, 2019

(51) Int. Cl.
| | | |
|---|---|---|
| *G06N 3/04* | (2006.01) | |
| *G06F 12/0868* | (2016.01) | |
| *G06N 3/063* | (2023.01) | |
| *G06N 3/049* | (2023.01) | |

(52) U.S. Cl.
CPC ....... *G06N 3/0481* (2013.01); *G06F 12/0868* (2013.01); *G06N 3/049* (2013.01); *G06N 3/063* (2013.01); *G06F 2212/2146* (2013.01); *G06F 2212/6042* (2013.01)

(58) Field of Classification Search
CPC ...... G06N 3/0481; G06N 3/049; G06N 3/063; G06F 12/0868; G06F 2212/2146; G06F 2212/6042
USPC ......................................................... 706/27
See application file for complete search history.

(56) References Cited

U.S. PATENT DOCUMENTS

2016/0042271 A1* 2/2016 Yoon .................. G06N 3/04
706/25

FOREIGN PATENT DOCUMENTS

EP 3343465 A1 * 7/2018 ........... G06N 3/0445

OTHER PUBLICATIONS

Fidjeland, et al., "NeMo: A Platform for Neural Modelling of Spiking Neurons Using GPUs", 2009 20th IEEE International Conference on Application-specific Systems, Architectures and Processors, 2009 (Year: 2009).*

(Continued)

*Primary Examiner* — Tsu-Chang Lee
(74) *Attorney, Agent, or Firm* — Schwegman Lundberg & Woessner, P.A.

(57) ABSTRACT

System configurations and techniques for implementation of a neural network in neuromorphic hardware with use of external memory resources are described herein. In an example, a system for processing spiking neural network operations includes: a plurality of neural processor clusters to maintain neurons of the neural network, with the clusters including circuitry to determine respective states of the neurons and internal memory to store the respective states of the neurons; and a plurality of axon processors to process synapse data of synapses in the neural network, with the processors including circuitry to retrieve synapse data of respective synapses from external memory, evaluate the synapse data based on a received spike message, and propagate another spike message to another neuron based on the synapse data. Further details for use and access of the external memory and processing configurations for such neural network operations are also disclosed.

25 Claims, 18 Drawing Sheets

(56) References Cited

OTHER PUBLICATIONS

Jin, et al. "Efficient Modelling of Spiking Neural Networks on a Scalable Chip Multiprocessor", 2008 IEEE International Joint Conference on Neural Networks, Jun. 1-8, 2008 (Year: 2008).*

* cited by examiner

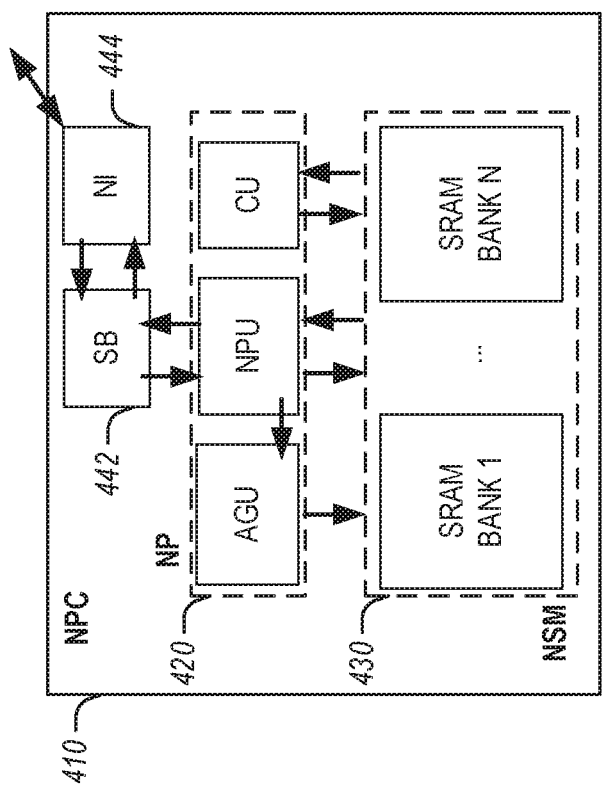
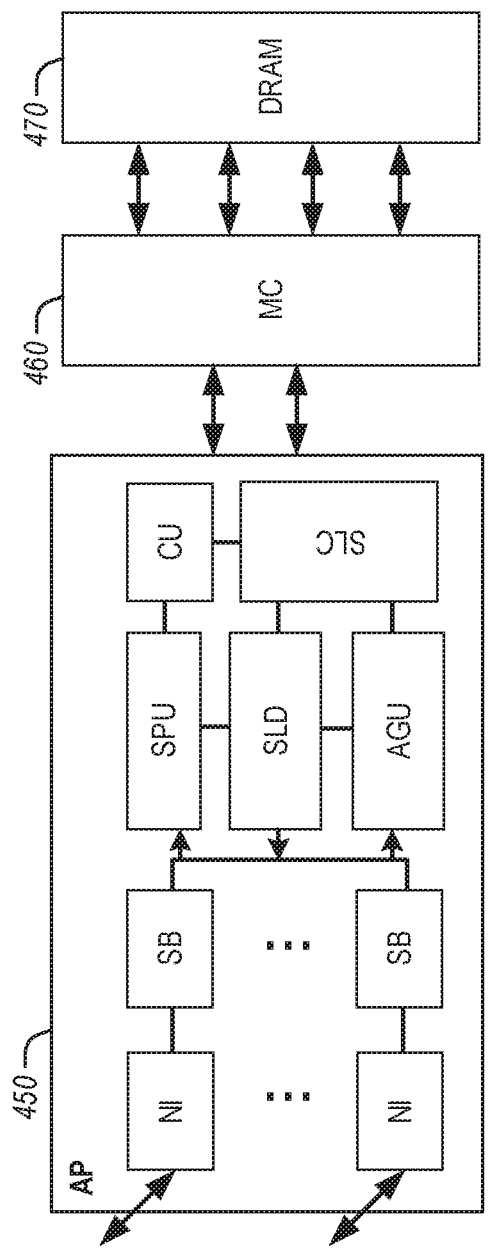

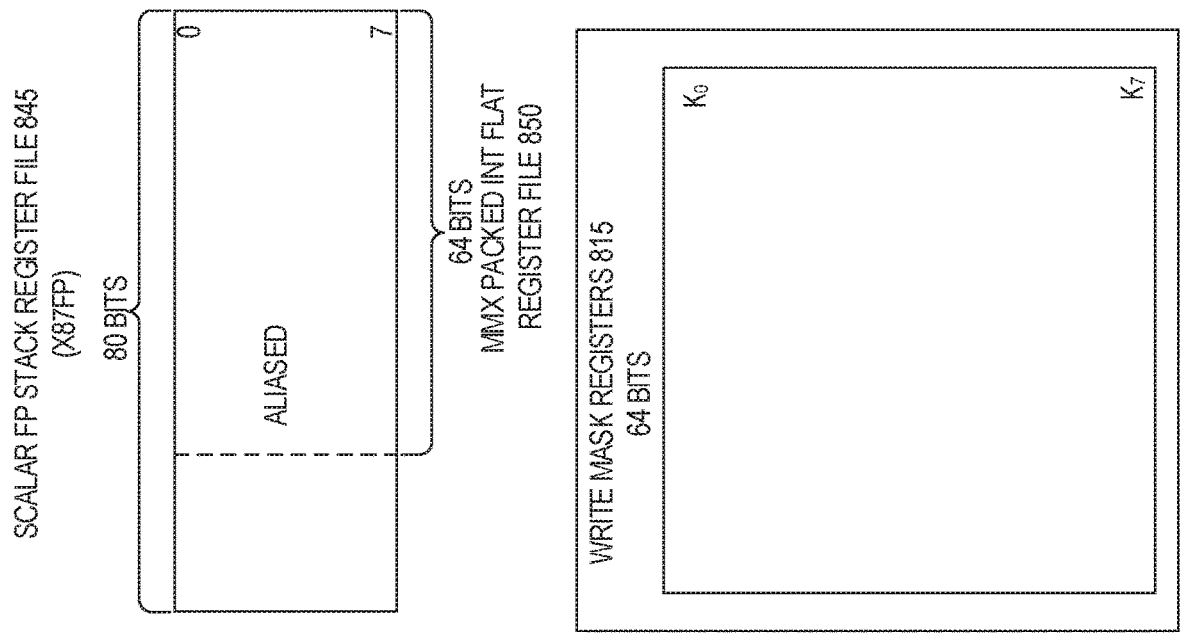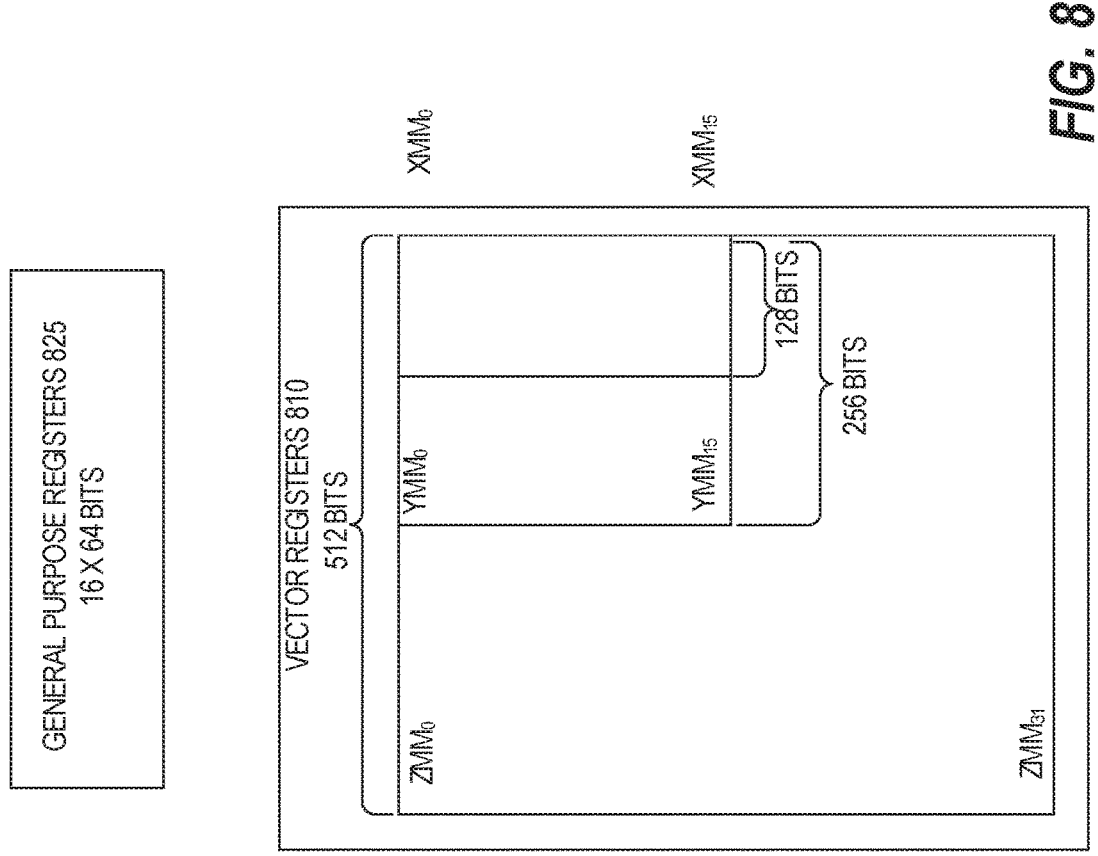
FIG. 8

SPIKING NEURAL NETWORK ACCELERATOR USING EXTERNAL MEMORY

TECHNICAL FIELD

The present disclosure relates generally to digital signal processing and, more particularly, to the arrangement of memory and processing resources in a spiking neural network (SNN) architecture. Some examples are applicable to neuromorphic computing using digital neuromorphic components such as neuron processors, axon processors, and SNN accelerator designs.

BACKGROUND

A neuromorphic processor is a processor that is structured to mimic certain aspects of the brain and its underlying architecture, particularly its neurons and the interconnections between the neurons, although such a processor may deviate from its biological counterpart. A neuromorphic processor may be composed of many neuromorphic (neural network) cores that are interconnected via a network architecture such as a bus or routing devices, which may direct communications between the cores. The network of cores may communicate via short packetized spike messages sent from core to core. Each core may implement some number of primitive nonlinear temporal computing elements (e.g., neurons).

When a neuron's activation exceeds some threshold level, the neuron may generate a spike (e.g., in the form of a spike message) that is propagated to a set of fan-out neurons contained in destination cores. The network then may distribute the spike messages to destination neurons and, in turn, those neurons update their activations in a transient, time-dependent manner.

One or more state variables that represent the neuron's activation level may be maintained for each neuron. In typical operation, the state variables experience a step change in response to the occurrence of a spike at the input or the output, which decays as a function of time in an exponential manner.

The use of neuromorphic hardware to implement SNNs has shown potential in several machine learning domains, but until now, most hardware SNN solutions have advocated including embedded components tracking the state of the neuron in low capacity SRAM arrays, within the neuromorphic processor itself. While such configurations may provide beneficial performance-per-energy characteristics, existing hardware approaches have limited the size and scope of types and configurations of SNNs that may be implemented.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A illustrates a configuration of a Neuron Processor Cluster for use in a neuromorphic hardware configuration, according to an embodiment.

FIG. 4B illustrates a configuration of an Axon Processor for use in a neuromorphic hardware configuration, according to an embodiment.

FIG. 8 is a block diagram of a register architecture according to an embodiment.

DETAILED DESCRIPTION

Figure 1:
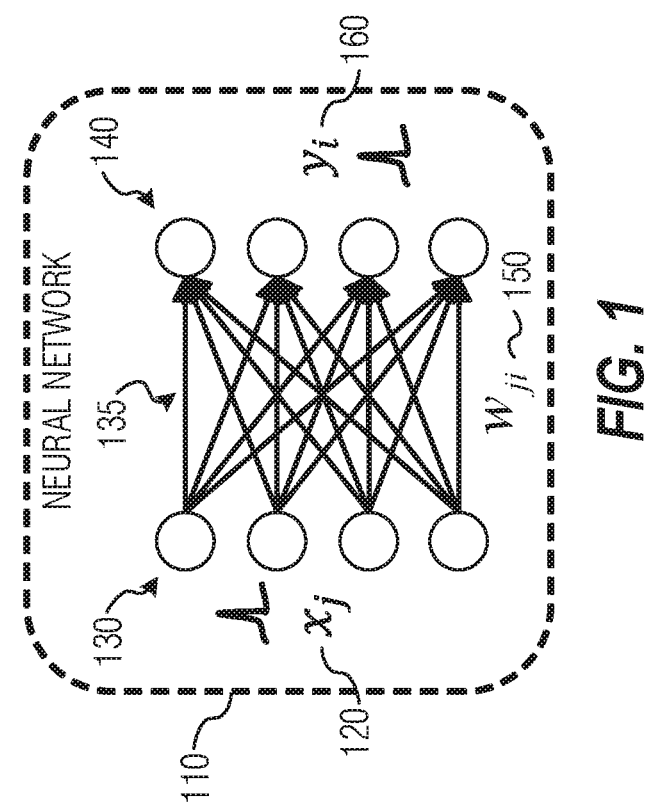
FIG. 1 illustrates an example diagram of a simplified neural network, according to an embodiment.

SNNs are intended to be "biologically plausible," to ultimately result in neural networks of similar complexity (e.g., number of connections and neurons) to, for example, mammalian brains. However, conventional approaches for designing SNNs have been limited based on memory and resource requirements for managing the states involved with neural processing. The following techniques discuss a cost-effective approach to achieve very large network sizes from a single processing node and external memory resources, while maintaining biologically plausible "real time" performance.

The following disclosure specifically includes a description of an example SNN accelerator architecture configuration, which is used to connect to external DRAM memory. For example, high-performance DRAM (e.g., HBM, Hybrid Memory Cube, etc.) may be used with the present architecture approaches to implement high performance and increased capacity of off-chip neural network states. The following disclosure further includes a description of a unique approach for partitioning and mapping SNN operations onto a high-speed memory architecture that may efficiently support large neural networks, as respective processing actions and blocks are segmented within an accelerator chip. This allows the use of much larger memory resources than available in current generations of SNN hardware (which is often limited to the use of on-chip SRAM memory).

Previous approaches for Processing-in-Memory (PIM)-style distributed SRAM-based accelerators are able to reach large network sizes only if multiple accelerator chips are networked together and are able to efficiently communicate with one another. Thus, some approaches have attempted to create large arrays of neural networks from combinations of neuromorphic CMOS integrated circuits, processor cores (e.g., integrating millions of such cores), GPUs, and FPGAs. However, PIM-based solutions for large network sizes are very expensive, requiring multiple logic chips and extensive networks, even spread across multiple circuit boards.

In addition to the expense, resource limitation, and processing overhead with such arrays, these approaches have failed to establish truly large neural networks that include a number of neurons which approaches the computing complexity of the human brain. Further, in large processor core arrays, the silicon area dedicated to SIMD vector units, FP arithmetic, and the like, serves only as an overhead for SNNs, because SNNs typically only require simple low precision arithmetic. Likewise, arrays built from large GPUs have not presented a good fit for large SNNs, because SNNs are a more communication-bottlenecked problem, rather than a compute-bound problem. Similarly, FP arithmetic and DSP hard IP blocks unnecessarily increase the power envelope for FPGA-based approaches. Moreover, current soft IP based memory interfaces for FPGAs provide limited bandwidth which is essential for high throughput in SNNs.

Embodiments detailed herein address these and other technical limitations of prior approaches by invoking the use of external memory resources into the processing operations of a neuromorphic architecture. As a result, the creation of a very large neural network, even into multi-millions or multi-billions of neurons, may he launched and utilized with use of a single accelerator chip. This is possible because the present approaches enable a "fanned-out" rather than a "fanned-in" neuromorphic accelerator architecture, to allow the many synapse states associated with the various neurons to be distributed to external memory. Additionally, aspects of spatial locality associated with synapses may be exploited in the present approaches by storing information from such synapses in an organized form in the external memory (e.g., in contiguous memory locations).

A SNN, in its basic form, resembles a graph with nodes and edges. In an SNN, the nodes are called neurons, and the edges between neurons are called synapses. A neuron is adapted to perform two functions: accumulate "membrane potential," and "spike." The membrane potential (also referred to as simply "potential") may resemble an accumulating counter, such that when the potential becomes high enough, the neuron spikes. This spiking neuron is commonly referred to as a "presynaptic neuron." When the presynaptic neuron spikes, it sends out spike messages along all of the presynaptic neuron's outgoing spike messages to all target neurons of the presynaptic neuron, called "postsynaptic neurons." Each of these messages has a "weight" associated with it, and these weights may be positive or negative, increasing or decreasing the postsynaptic neuron's potential. Additionally, time is a very important aspect of SNNs, and some spike messages may take longer to arrive at the postsynaptic neuron than others, even if they were sent from the presynaptic neuron at the same time.

Figure 2:
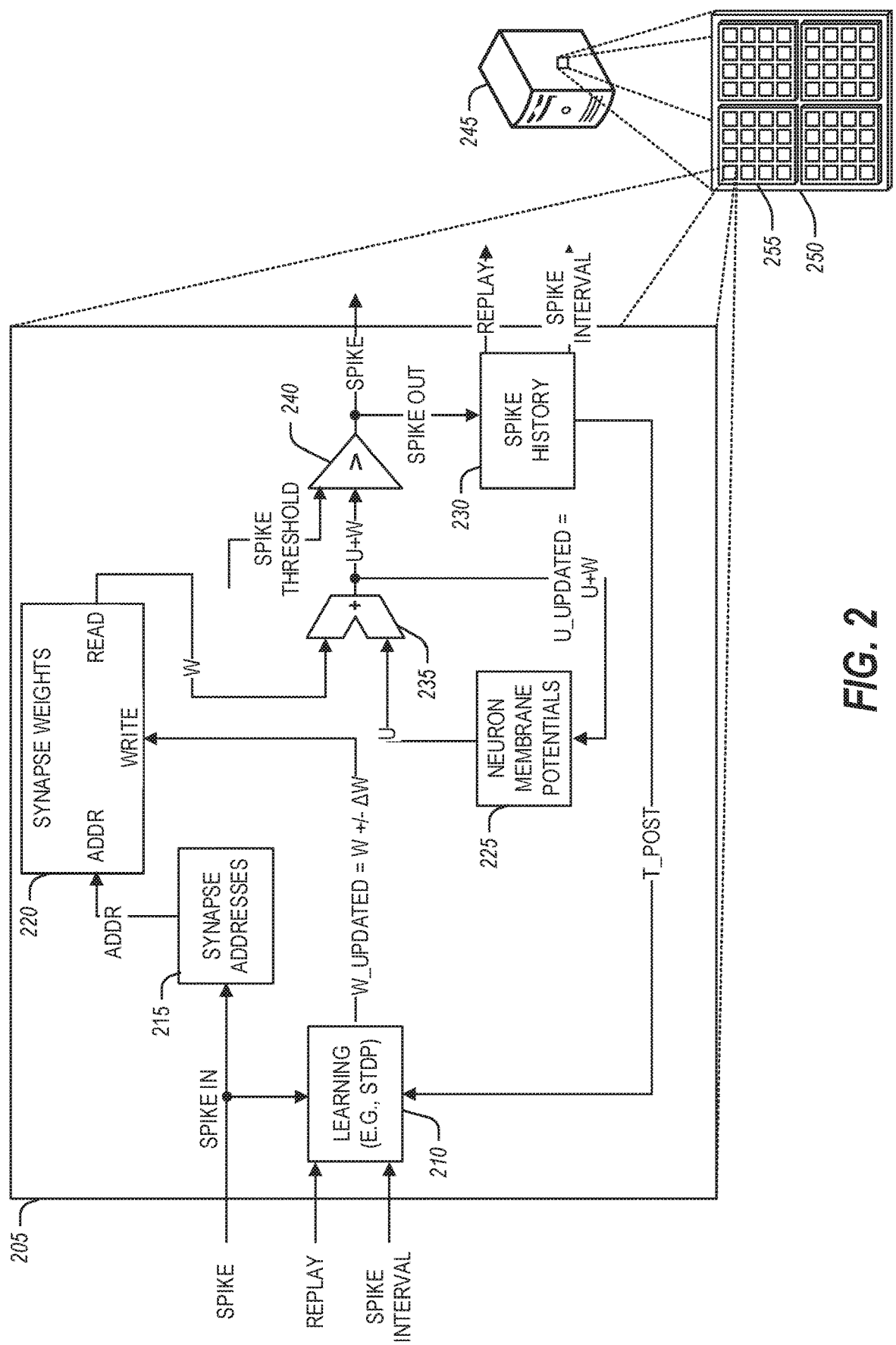
FIG. 2 illustrates a high-level diagram of a model neural core structure, according to an embodiment.
Figure 3:
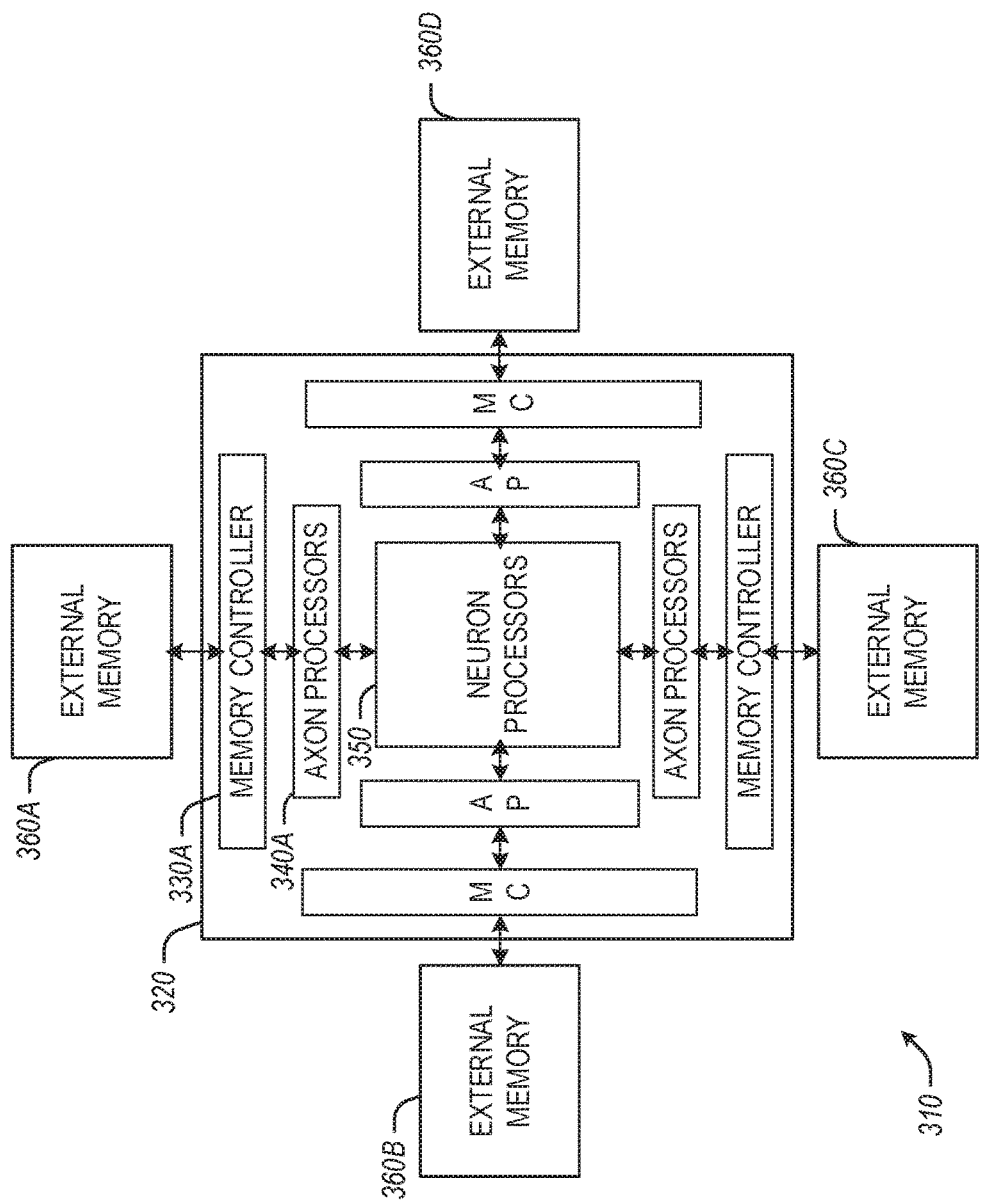
FIG. 3 illustrates an overview of a neuromorphic architecture design for a spiking neural network, according to an embodiment.
Figure 5:
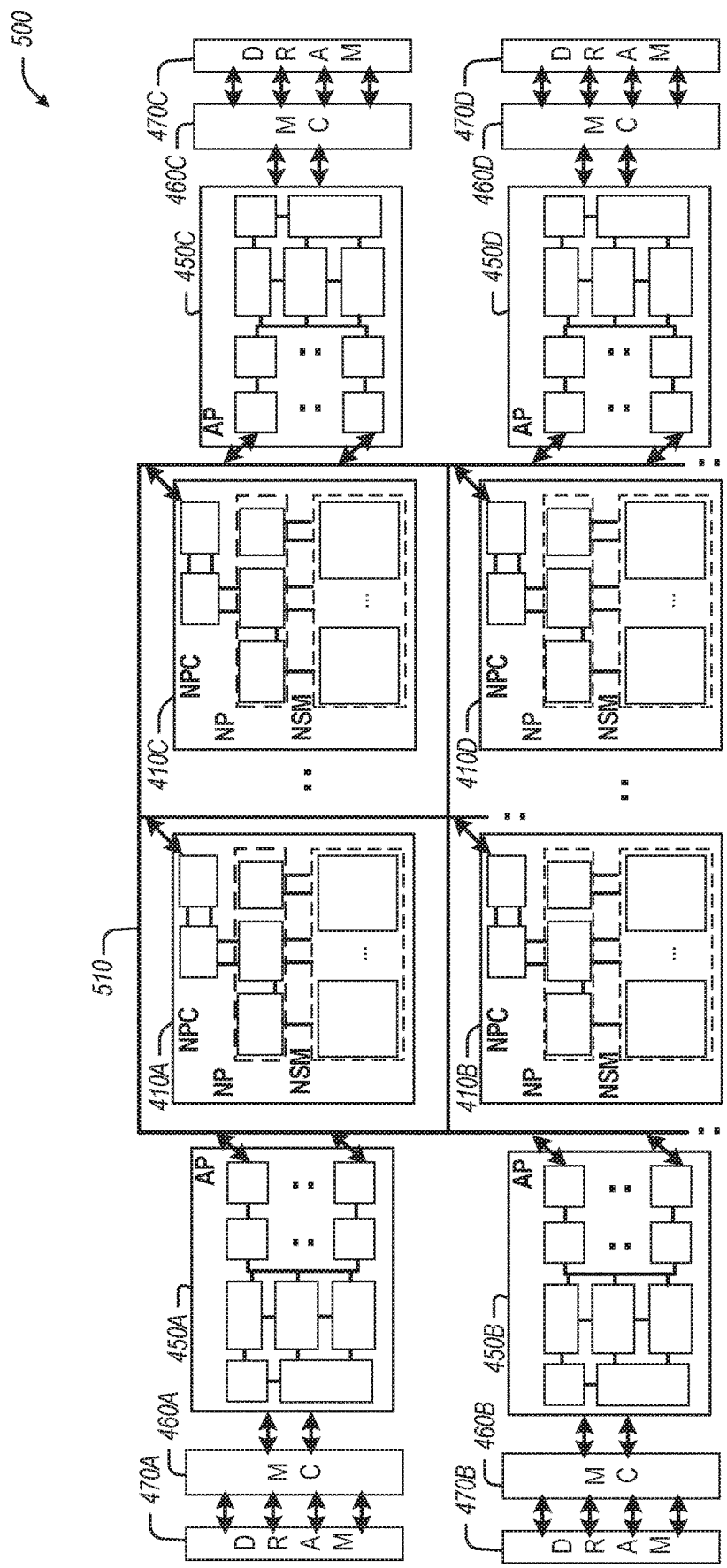
FIG. 5 illustrates a system-level view of the neuromorphic hard are configuration of FIGS. 3 to 4B, according to an embodiment.

The following configurations, specifically as detailed in FIGS. 3 to 5, provide a configuration of an accelerator chip for implementing a SNN that stores synaptic data with external memory. The context in which a SNN operates, and an overall architecture of a SNN as implemented in neuromorphic hardware, is provided in FIGS. 1 and 2 and discussed in the following paragraphs. Also, as used herein, references to "neural network" for at least some examples is specifically meant to refer to a SNN; thus, many references herein to a "neuron" are meant to refer to an artificial neuron in a SNN. It will he understood, however, that certain of the following examples and configurations may also apply to other forms or variations of artificial neural networks.

FIG. 1 illustrates an example diagram of a simplified neural network 110, providing an illustration of connections 135 between a first set of nodes 130 (e.g., neurons) and a second set of nodes 140 (e.g., neurons). Neural networks (such as the simplified neural network 110) are commonly organized into multiple layers, including input layers and. output layers. It will be understood that the simplified neural network 110 only depicts two layers and a small numbers of nodes, but other forms of neural networks may include a large number of nodes, layers, connections, and pathways.

Data that is provided into the neural network 110 is first processed by synapses of input neurons. Interactions between the inputs, the neuron's synapses, and the neuron itself govern whether an output is provided to another neuron. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$ 150) from neuron j (e.g., located in a layer of the first set of nodes 130) to neuron i (e.g., located in a layer of the second set of nodes 140). The input received by neuron j is depicted as value $x_j$ 120, and the output produced from neuron i is depicted as value $y_i$ 160. Thus, the processing conducted in a neural network is based on weighted connections, thresholds, and evaluations performed among the neurons, synapses, and other elements of the neural network.

In an example, the neural network 110 is established from a network of SNN cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time--dependent manner, similar to the operation of real biological neurons.

The neural network 110 further shows the receipt of a spike, represented in the value $x_j$ 120, at neuron j in a first set of neurons (e.g., a neuron of the first set of nodes 130). The output of the neural network 110 is also shown as a spike, represented by the value $y_i$ 160, which arrives at neuron i in a second set of neurons (e.g., a neuron of the first set of nodes 140) via a path established by the connections 135. In a spiking neural network all communication occurs over event-driven action potentials, or spikes. In an example, the spikes convey no information other than the spike time as well as a source and destination neuron pair. Computation occurs in each neuron as a result of the dynamic, nonlinear integration of weighted spike input using real-valued state variables. The temporal sequence of spikes generated by or for a particular neuron may be referred to as its "spike train."

In an example of a SNN, activation functions occur via spike trains, which means that time is a factor that has to be considered. Further, in a SNN, each neuron may be modeled after a biological neuron, as the artificial neuron may receive its inputs via synaptic connections to one or more "dendrites" (part of the physical structure of a biological neuron), and the inputs affect an internal membrane potential of the artificial neuron "soma" (cell body). As previously discussed, in a SNN, the artificial neuron "fires" (e.g., produces an output spike), when its membrane potential crosses a firing threshold. Thus, the effect of inputs on a SNN neuron operates to increase or decrease the internal membrane potential, making the neuron more or less likely to fire. Further, in a SNN, input connections may be stimulatory or inhibitory. A neuron's membrane potential may also be affected by changes in the neuron's own internal state ("leakage").

In some examples, the neural network may utilize spikes in a neural network pathway to implement learning using a learning technique such as spike timing dependent plasticity (STDP). For instance, a neural network pathway may utilize one or more inputs (e.g., a spike or spike train) being provided to a presynaptic neuron $X_{PRE}$ for processing; the neuron $X_{PRE}$ causes a first spike, which is propagated to a neuron $X_{POST}$ for processing; the connection between the neuron $X_{PRE}$ and the postsynaptic neuron $X_{POST}$ (e.g., a synaptic connection) is weighted based on a weight. If inputs received at neuron $X_{POST}$ (e.g., received from one or multiple connections) reach a particular threshold, the neuron $X_{POST}$ will activate (e.g., "fire"), causing a second spike.

The determination that the second spike is caused as a result of the first spike may be used to strengthen the connection between the neuron $X_{PRE}$ and the neuron $X_{POST}$ (e.g., by modifying a weight) based on principles of STDP. Specifically, STDP may be used to adjust the strength of the connections (e.g., synapses) between neurons in a neural network, by correlating the timing between an input spike (e.g., the first spike) and an output spike (e.g., the second spike). in further examples, the weight may be adjusted as a result of long-term potentiation (LTP), long term depression (LTD), or other techniques. A neural network pathway, when combined with other neurons operating on the same principles, may exhibit natural unsupervised learning as repeated patterns in the inputs will have pathways strengthened over time. Conversely, noise, which may produce the spike on occasion, will not be regular enough to have associated pathways strengthened.

FIG. 2 illustrates a high-level diagram of a model neural core structure, according to an embodiment. The following neural core structure may implement additional techniques and configurations, such as is discussed below for use with external memory. Thus, the diagram of FIG. 2 is provided as a simplified example of how neuromorphic hardware operations may be performed.

In an example, a neural-core 205 may be on a die with several other neural cores to form a neural-chip 255. Several neural-chips may be packaged and networked together to form neuromorphic hardware 250, which may be included in any number of devices 245, such as servers, mobile devices, sensors, actuators, etc. The illustrated neural-core structure functionally models the behavior of a biological neuron in the manner described above. A signal is provided at an input (e.g., ingress spikes, spike in, etc.) to a synapse (e.g., modeled by synaptic weights 220 in a synaptic variable memory) that may result in fan-out connections within the core to other dendrite structures with appropriate weight and delay offsets (e.g., represented by the synapse addresses 215 to identify to which synapse a dendrite corresponds). The signal may be modified by the synaptic variable memory (e.g., as synaptic weights are applied to spikes addressing respective synapses) and made available to the neuron model. For instance, the combination of the neuron membrane potentials 225 may be multiplexed 235 with the weighted spike and compared 240 to the neuron's potential to produce an output spike (e.g., egress spikes via an axon to one or several destination cores) based on weighted spike states.

In an example, a neuromorphic computing system may employ learning 210 such as with the previously described STDP techniques. For instance, a network of neural network cores may communicate via short packetized spike messages sent from core to core. Each core may implement some number of neurons, which operate as primitive nonlinear temporal computing elements. When a neuron's activation exceeds some threshold level, the neuron generates a spike message that is propagated to a set of fan-out neurons contained in destination cores. In managing its activation level, a neuron may modify itself (e.g., modify synaptic weights) in response to a spike. These operations may model a number of time-dependent features. For example, following a spike, the impact of PRE spike may decay in an exponential manner. This exponential decay, modeled as an exponential function, may continue for a number of time steps, during which additional spikes may or may not arrive.

The neural-core 205 may include a memory block that is adapted to store the synaptic weights 220, a memory block for neuron membrane potentials 225, integration logic 235, thresholding logic 240, on-line learning and weight update logic based on STDP 210, and a spike history buffer 230. With the techniques discussed herein (e.g., with reference to FIGS. 3 to 5, below), the synaptic weights 220 and membrane potentials 225 may be divided between on-chip neuron state data (e.g., stored in internal SRAM) and off-chip synapse data (e.g., stored in DRAM).

In a specific implementation, when a spike from a presynaptic neuron is received, the synaptic weight is accessed and is added to the post-synaptic neuron's membrane potential (u). An outgoing spike is generated if the updated (u) is larger than a pre-set spike threshold. The outgoing spike resets a spike history buffer, which counts how many time-steps have passed since the last time each neuron in the core has spiked ($t_{POST}$). In a further example, the neural-core may implement variations of on-line (e.g., in chip) learning operations performed in the proposed core, such as LTD, single PRE spike LTP, or multiple PRE spike LTP.

The new synaptic weights, as computed by $\Delta w$, are installed in the synaptic memory to modify (e.g., weight) future PRE spikes, thus modifying the likelihood that a particular combination of PRE spikes causes a POST spike. The network distributes the spike messages to destination neurons and, in response to receiving a spike message, those neurons update their activations in a transient, time-dependent manner, similar to the operation of biological neurons.

The basic implementation of some applicable learning algorithms in the neural-core 205 may be provided through STDP, which adjusts the strength of connections (e.g., synapses) between neurons in a neural network based on correlating the timing between an input (e.g., ingress) spike and an output (e.g., egress) spike. Input spikes that closely precede an output spike for a neuron are considered causal to the output and their weights are strengthened, while the weights of other input spikes are weakened. These techniques use spike dines, or modeled spike times, to allow a modeled neural network's operation to be modified according to a number of machine learning modes, such as in an unsupervised learning mode or in a reinforced learning mode.

In further example, the neural-core 205 may be adapted to support backwards-propagation processing. In biology, when the soma spikes (e.g., an egress spike), in addition to that spike propagating downstream to other neurons, the spike also propagates backwards down through a dendritic tree, which is beneficial for learning. The synaptic plasticity at the synapses is a function of when the postsynaptic neuron fires and when the presynaptic neuron is firing the synapse knows when the neuron is fired. Thus, in a multi-compartment architecture, once the soma fires, there are other elements that know that the neuron fired in order to support learning, e.g., so all of the input fan-in synapses may see that the neuron fired. The learning component 210 may implement STDP and receive this backwards action potential (bAP) notification (e.g., via trace computation circuitry) and communicate with and adjust the synapses accordingly. However it will be understood that changes to the operational aspects of the neural-core 205 may vary significantly, based on the type of learning, reinforcement, and spike processing techniques used in the type and implementation of neuromorphic hardware.

FIG. 3 illustrates an overview of a proposed neuromorphic architecture 310 for a spiking neural network. Specifically, the architecture depicts an accelerator chip 320 arranged for storing and retrieving synaptic data of neural network operations in external memory.

The accelerator chip 320 is arranged to include three types of components: Neuron Processors 350, Axon Processors (APs) 340 (e.g., a first set of axon processors 340A), and Memory Controllers (MCs) 330 (e.g., a first memory controller 330A), in addition to necessary interconnections among these components (e.g., a bus). In the architecture 310, the work of processing functions of the SNN is configured to be divided between the Neuron Processors 350 and the Axon Processors 340 with the following configurations.

In an example, each Axon Processor is arranged to be tightly coupled to one physical channel of External Memory 360 (e.g., as indicated with respective sets of memory 360A, 360B, 360C. 360D), with the respective Axon Processor being in charge of processing the spikes whose synapse data resides in that channel of memory. The external memory 360 may constitute respective sets or arrangements of high-performance DRAM (e.g., High Bandwidth Memory (HBM) standard DRAM, Hybrid Memory Cube (HMC) standard DRAM, etc.); in other examples, the external memory may constitute other forms of slower but denser memory (including stacked phase-change memory (e.g., implementing the 3D XPoint standard), DDRx-SDRAM, GDDRx SDRAM, LPDDR SDRAM, direct through-silicon via (TSV) die-stacked DRAM, and the like).

In addition to the processing being split between multiple components in the accelerator chip 320, the storage of the various SNN states is also divided. Neuron state is stored on-chip adjacent to the Neuron Processors 350, such as in an on-chip SRAM implementation (not shown); synapse data, however, is stored in the external memory 360. This division is performed for two primary reasons: the size of the data, and the locality of the data.

Synapse data takes up orders of magnitude more memory space than neuron state data. Also, the synapse data is accessed with high spatial locality, but no temporal locality, whereas the neuron data is accessed with no spatial locality, but high temporal locality. Further, there is a strong notion of time in SNNs, and some spike messages take more time to generate and propagate than others. In the SNN accelerator 300, similar to conventional SNN accelerator designs, time is broken up into discrete, logical "time steps." During each time step, some spike messages will reach their target, and some neurons may spike. These logical time steps each take many accelerator clock cycles to process. Storage of the synapse data may be appropriate in the external memory 360 during relatively large amounts of time where such data is not being used.

A significant neuromorphic processing problem solved with the configuration of the SNN accelerator 300, however, is the balance of network size and programmability. In some SRAM-based SNN accelerators, in order to achieve even moderate neural network sizes, constraints are placed on the connections that can and cannot be made between neurons (i.e., synapse programmability). These constraints may take the form of synapse sharing between neurons, limited connectivity matrices, or restrictive compression demands. In other words, each neuron is prevented from having a unique set of synapses connecting the neuron to a set of arbitrary target neurons. The increased capacity of external memory banks allows for the flexibility of far greater expansions to the SNN, where each synapse is defined by a unique <target, weight> pair. However, the same techniques used for managing synapses and neuron states in SRAM-based SNN accelerators may be used within the SNN accelerator 300, further multiplying the already very large effective capacity that the SNN accelerator 300 provides with the External Memory 360.

In the External Memory 360, each neuron has a list of <target, weight> pairs specifying its synapses. This list is further organized in the memory by time step (also referred to as a "delay slot"), where all of the synapses that will "arrive" at their postsynaptic neuron at the same time are stored in memory next to each other. For instance, the synaptic data may be stored in contiguous or consecutive memory blocks, or in locations in the memory that allow writing or reading to occur with a reduced number of operations or amount of time. In an example, during each given time step of the neural network, all of the synapses of a presynaptic neuron that will arrive during that time step are fetched from the External Memory 360; whereas none of the synapses pertaining to other time steps are fetched from the External Memory 360.

As an example of operation of the SNN accelerator chip architecture 310, consider the moment that a presynaptic neuron spikes. As discussed above, a neuron spikes because its potential rose above a predetermined (programmable) threshold, as determined by the Neuron Processor 350 where that neuron is maintained. When the neuron spikes, it sends a spike message (including the presynaptic neuron's ID) to the Axon Processor connected to the channel of memory where its synapse data is maintained (e.g., a particular Axon Processor included in the set of Axon Processors 340A). This particular Axon Processor adds the spiking neuron ID to a list of spiking neurons, and will begin processing its first delay slot synapses during the next time step.

When the next time step begins, the particular Axon Processor fetches (e.g., from the External Memory 360A via the Memory Controller 330A) the synapses pertaining to the presynaptic neuron's current delay slot, but the Axon Processor does not yet fetch the synapses for other delay slots. The presynaptic neuron ID remains in the Axon Processor's list of spiking neurons for several more time steps, until all of its delay slots have been fetched and processed. As the per-time step synapse list is being fetched, the Axon Processor reads the list of <target, weight> pairs to create spike messages, which are sent out to postsynaptic neurons with the specified weight, thus pre-applying the synapse weights of the recipient postsynaptic neurons. Each such spike message leaves the Axon Processor and goes back into the Neuron Processors 350, where it finds the particular Neuron Processor in charge of the particular postsynaptic neuron.

Once the spike message is delivered, the particular Neuron Processor will fetch the postsynaptic neuron's state from a local SRAM (not shown); this Neuron Processor will then modify the target neuron's potential according to the weight of the spike message, and then write the neuron state back to its local SRAM. At the end of each time step, all of the neurons in all of the Neuron Processors 350 must be scanned to see if they spiked during that time step. If they have, the neurons send a spike message to the appropriate Axon Processor, and the whole process begins again. If a neuron does not spike during this time step, then its potential will be reduced slightly, according to some "leak" function. Other variations to the operation of the neural network may occur based on the particular design and configuration of such network.

In an example, a neuromorphic hardware configuration of the SNN accelerator 300 may be implemented through an accelerator hardware chip including a plurality of neuromorphic cores and a network to connect the respective cores. As discussed in the following configurations, a respective neuromorphic core may constitute a "neuron processor cluster" (hereinafter, NPC), to perform the operations of the neuron processors 350, or an "axon processor" (AP), to perform the operations of the axon processors 340. Thus, in contrast to a conventional neuromorphic hardware design where a single core type distributed across a network includes processing capabilities for both neurons and axons, the present design includes two core types distributed across a network that are separated into neuron and axon functions.

FIG. 4A illustrates an example configuration of a Neuron Processor Cluster (NPC) for use in the present neuromorphic hardware configuration (e.g., the architecture 310 discussed in FIG. 3). As shown, the NPC 410 is comprised of three main components: one or more Neuron Processors 420 (NPs), an SRAM-based Neuron State Memory 430 (NSM), and a connection 440 to the on-chip network (the Network Interface (NI) 444 and Spike Buffer (SB) 442). In an example, processing of all neurons is performed in a time multiplexed fashion, with an NP 420 fetching neuron state from the NSM 430, modifying the neuron state, and then writing the neuron state back before operating on another neuron. The NSM 430 may be multi-banked to facilitate being accessed by more than one NP in parallel.

When a spike message arrives at the NPC 410, the spike message is buffered at the SB 442 until the message can be processed. An Address Generation Unit (AGU) determines the address of the postsynaptic neuron in the NSM 430, whose state is then fetched, and then the Neuron Processing Unit (NPU) adds the value of the spike's weight to the postsynaptic neuron's potential before writing the neuron state back to the NSM 430. At the end of the current time step, all neurons in all NPCs are scanned by the NPUs to see if their potential has risen above the spiking threshold. If a neuron does spike, a spike message is generated, and sent to the appropriate Axon Processor via the NI 444.

In an example, the NPU is a simplified arithmetic logic unit (ALU) which only needs to support add, subtract, shift and compare operations at a low precision (for example, 16-bits). The NPU is also responsible for performing membrane potential leak for the leaky-integrate-tire neuron model. Due to time multiplexing, the number of physical NPUs is smaller than the total number of neurons. Finally, a Control Unit (CU) orchestrates the overall operation within the NPC, which may be implemented as a simple finite-state machine or a micro-controller.

FIG. 4B illustrates an example configuration of an Axon Processor (AP) 450 for use in the present neuromorphic hardware configuration (e.g., the architecture 310 discussed in FIG. 3). The Axon Processor (AP) 450 includes a memory pipeline for storing and accessing the synaptic data, as the synaptic state is stored in an external high bandwidth memory and accessed via various Axon Processors (AP). For example, as shown in FIG. 4B, the AP 450 is connected to DRAM 470 via a Memory Controller (MC) 460.

Similar to the NPC 410, the AP 450 employs NIs and SBs to send and receive spike messages to/from the network-on-chip. In order to generate the spike messages to send to the postsynaptic neurons, an AGU first generates the corresponding address for a synapse list of the presynaptic neuron (a "synapse list"). The synapse list may include headers containing information regarding the length, connectivity, type, etc. of the synapses. A Synapse List Decoder (SLD) is responsible for parsing the synapse list and identifying such headers, target neuron IDs, synaptic weights and so on. The SLD works in conjunction with the AGU to fetch the entire synapse list. Synapse list sizes may vary between presynaptic neurons.

in an example, synapse lists are organized as delay slot-ordered, so the AP 450 will fetch only the list of synapses for the current delay slot, which is temporarily buffered at a Synapse List Cache (SLC). The AP 450 sends out spike messages of the current delay slot to the network. If the SNN size is small enough, and the SLC is large enough, synapses in the next delay slots may be pre-fetched and kept in the SLC. Reading a synapse list from the External Memory (the DRAM 470) has very good spatial locality, leading to high bandwidth.

In the course of processing a spike, an AP 450 will dispatch several spike messages to the network which will be consumed by several NPCs. Hence, each AP may have multiple drop-off points to the network (i.e. multiple NIs and SBs) to account for any bandwidth imbalance between NPC and AP.

Additionally, the AP may include a Synaptic Plasticity Unit (SPU) which is responsible for providing updates to the synaptic data. These updates may include incrementing, decrementing, pruning, and creating synaptic connections. The SPU may implement various learning rules including spike-timing dependent plasticity (STDP), short/long term depression/potentiation, or the like. SPU updates also may be performed on the synaptic data fetched from memory, before writing it back, to eliminate additional read-modify-writes.

FIG. 5 provides a further illustration of a system-level view 500 of the neuromorphic hardware configuration architecture (e.g., the architecture 310 discussed in FIG. 3). As shown, the architecture includes instances of the APs 450 (e.g., APs 450A, 450B, 450C, 450D) and NPCs 410 (e.g., APCs 410A, 410B, 410C, 410D), generally corresponding to the instances of such APs and NPCs depicted in FIGS. 4A and 4B. In particular, the architecture in view 500 illustrates the interconnection of the NPCs and APs via a network 510.

Figure 6A:
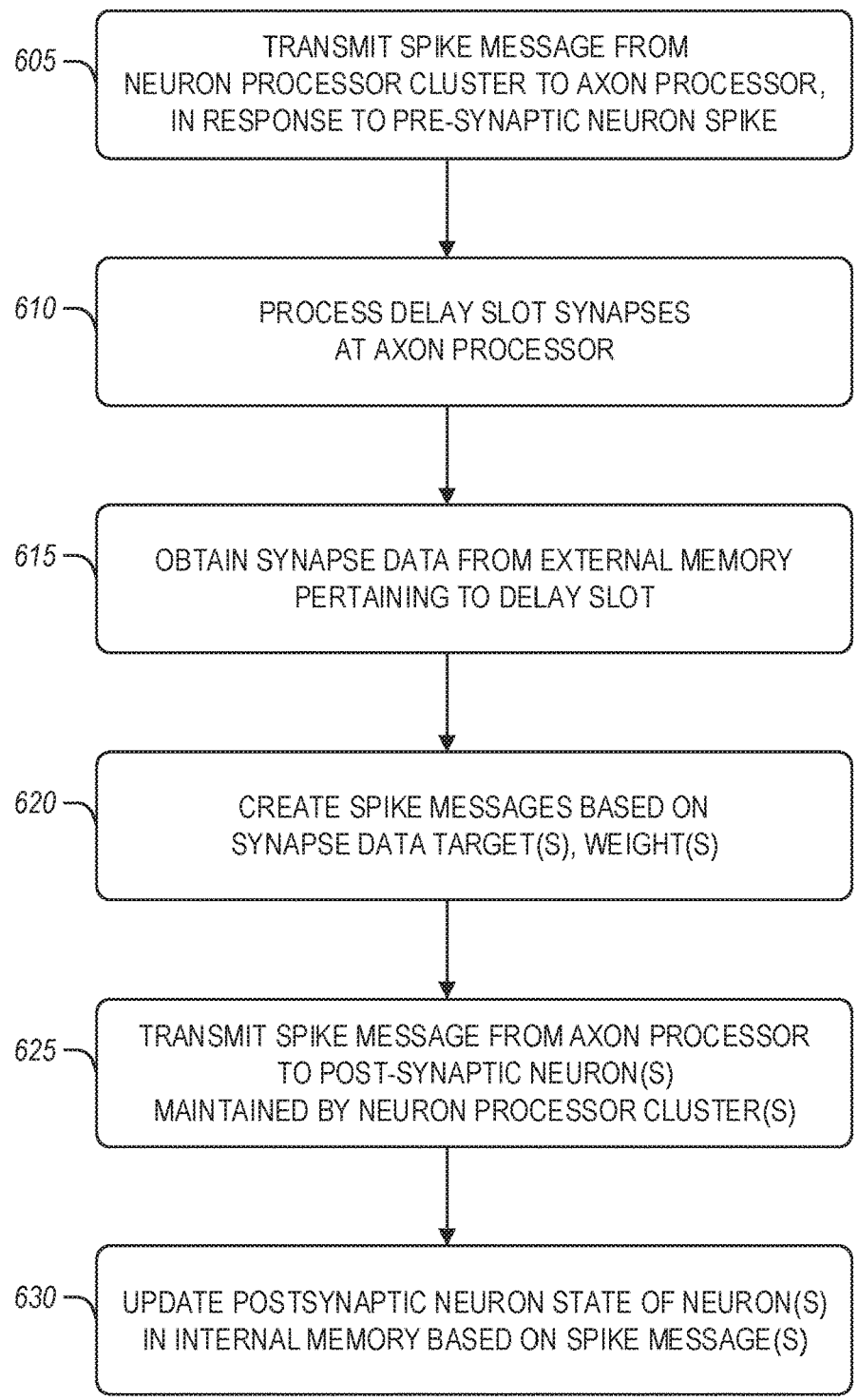
FIG. 6A illustrates a flowchart of an example of a method for processing spiking neural network operations with a neuromorphic hardware accelerator using external memory, according to an embodiment.

FIG. 6A illustrates a flow diagram of an example method 600 for processing spiking neural network operations with a neuromorphic hardware accelerator using external memory. The operations of the method 600 are performed by a computer hardware configuration, such as that described above (e.g., the neuromorphic hardware configuration depicted in FIGS. 3 to 5), or below (e.g., other variations of computing processing circuitry). As will be understood, the following method 600 may be performed directly by the hardware configuration, or embodied by a configuration (including instructions to configure) to perform the method 600.

The method 600 commences at the point in time where a pre-synaptic neuron spikes (e.g., activates, fires). At operation 605, a spike message is transmitted from neuron processor cluster to an axon processor, in response to the pre-synaptic neuron spike activation.

At operation 610, the axon processor commences operations to process and identify synapses for one or more time slots (delay slots).

At operation 615, the axon processor obtains synapse data from memory (e.g., external DRAM memory) that pertains the relevant one or more time slots. This synapse data includes information to identify the target and weights of the respective synapses.

At operation 620, the axon processor creates one or more spike messages based on the various data targets and weights for the respective synapses.

At operation 625, the axon transmits each spike message from the axon processor to one or more neuron processor clusters, which may be a different neuron processor cluster than used to send the spike from the pre-synaptic neuron. Respective spike messages for each of the synaptic connections may be transmitted, to one or more neuron processing core, based on the identified data targets and weights.

At operation 630, the states of the various post-synaptic neurons are updated by the one or more neuron processing cores, based on the spike messages that were propagated via the synapses. Specifically, the states of the one or more post-synaptic neurons are updated in internal memory by the neuron processing cores.

Figure 6B:
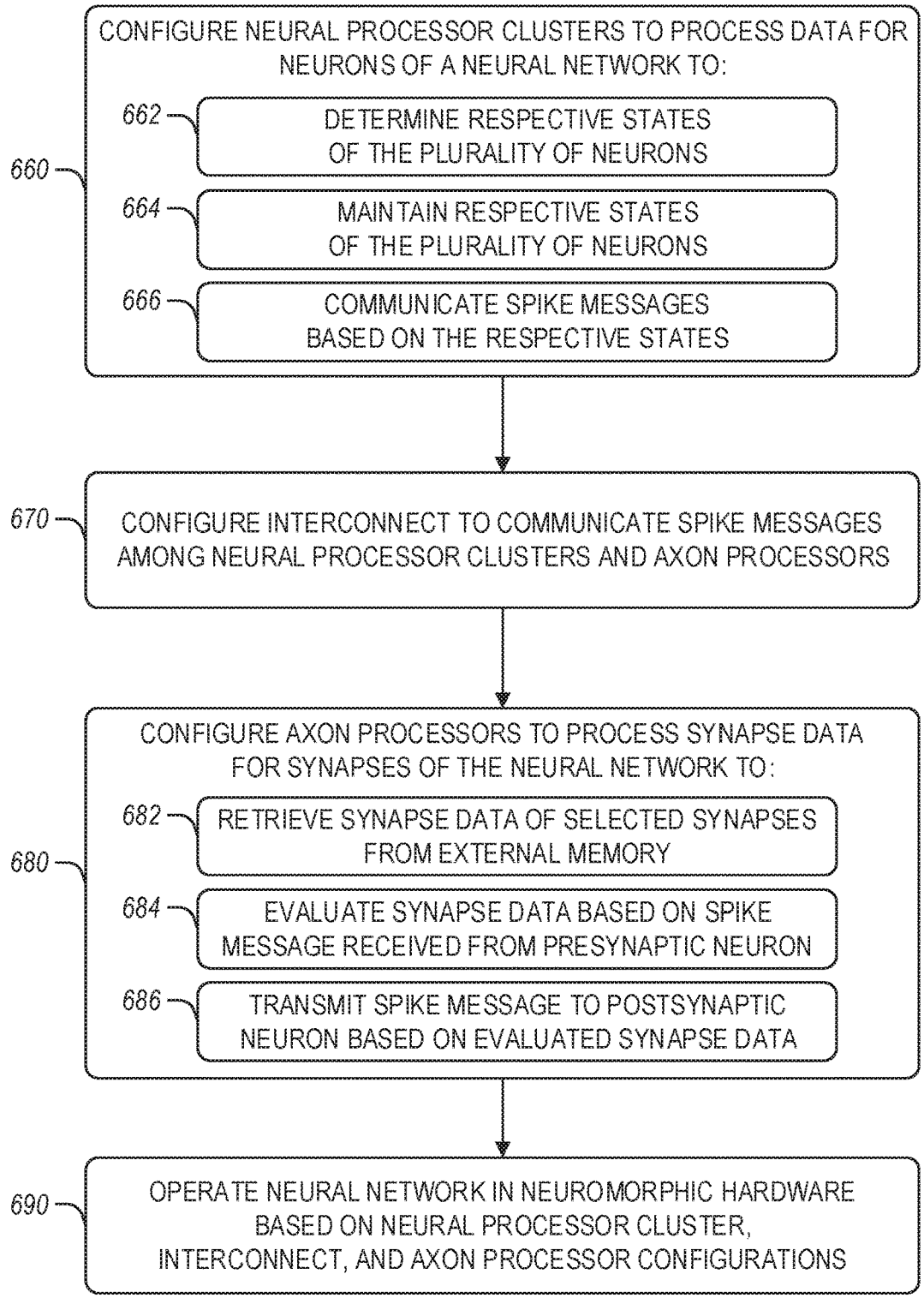
FIG. 6B illustrates a flowchart of an example of a method for configuring spiking neural network operations in a neuromorphic hardware accelerator, according to an embodiment.

FIG. 6B illustrates a flow diagram of an example method 650 for configuring spiking neural network operations in a neuromorphic hardware accelerator. The operations of the configuration method 650 are performed by a computer hardware configuration, such as that described above (e.g., the neuromorphic hardware configuration depicted in FIGS. 3 to 5), or below (e.g., other variations of computing processing circuitry). As will be understood, the following configuration method 650 may be performed directly by the hardware configuration, or embodied by instructions to configure, or an arrangement of circuitry, to perform the configuration method 650. It will be further understood that the result of the configuration method 650 may be a one-time or repeated operation, depending on an implementation use case.

At operation 660, neural processor clusters (e.g., embodied by neural processing circuitry) is configured to operate a plurality of neurons of a neural network, with the configuration resulting in the respective clusters adapted to: determine respective states of the plurality of neurons (configuration operation 662); maintain the respective states of the plurality of neurons (configuration operation 664); and communicate spike messages within the neuromorphic processing circuitry, based on the respective states (configuration operation 666).

At operation 670, an interconnect (e.g., a bus, or network) is configured to communicate spike messages among neural processor clusters and axon processors.

At operation 680, axon processors (e.g., embodied by axon processing circuitry) are configured to process synapse data of a plurality of synapses in the neural network, with the configuration resulting in the respective processors adapted to: retrieve synapse data of a subset of the plurality of synapses from a bank of memory, with the memory being external to the neuromorphic processing circuitry (configuration operation 682); evaluate the synapse data, based on a spike message received from a presynaptic neuron of a neural processor cluster (configuration operation 684); and transmit, based on the evaluated synapse data, a spike message to a postsynaptic neuron at a neural processor cluster (configuration operation 686).

In an example, each of the axon processors is coupled to a respective bank of external memory. In a further configuration example, the axon processors are coupled to the external memory via a plurality of memory controllers, such that each of the memory controllers is coupled to a respective bank of the external memory, and at least one of the axon processors is coupled to a respective controller of the memory controllers.

The configuration method 650 concludes with the operation of the neural network in neuromorphic hardware based on neural processor cluster, interconnect, and axon processor configurations. The neural network and the respective neural processing clusters and axon processors may operate according to any of the techniques and configurations discussed herein.

The examples described above specifically related to the use of a particular hardware configuration involving the use of separated neuron and axon processors, and the storage of synapse data from the axon processors onto external memory. However, the operations of the method 600 may be extended to include a model whereby other information or additional information may be persisted into external memory. Further, other modifications to the SNN operations, data types, and processing events may also be implemented.

Figure 7:
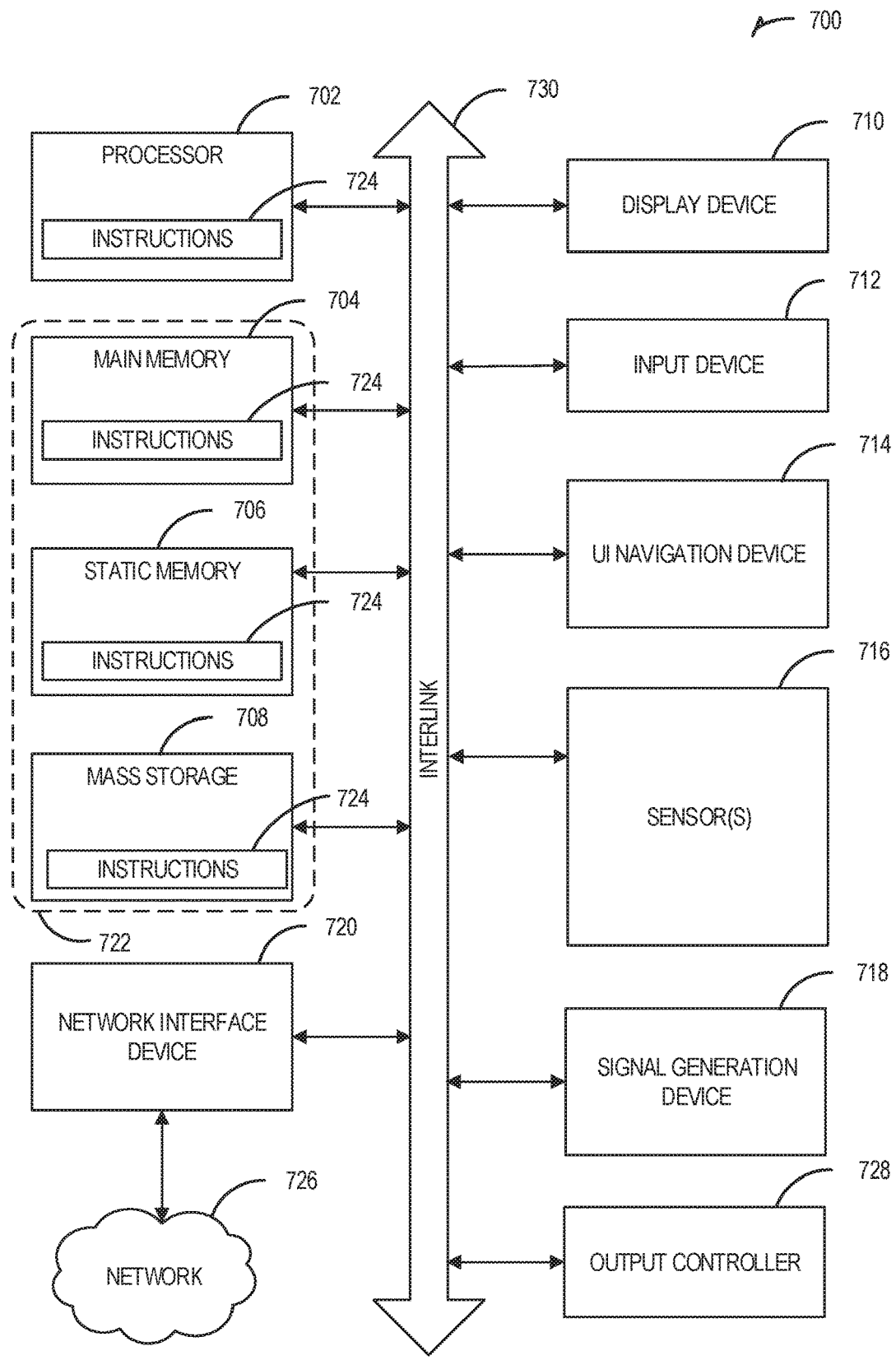
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc. Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non--limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

FIGS. 8 through 17 illustrate several additional examples of hardware structures or implementations that may be used to implement computer hardware.

FIG. 8 is a block diagram of a register architecture 800 according to an embodiment. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 815—in the embodiment illustrated, there are 8 write mask registers (k0 through k7), each 64 bits in size. In an alternate embodiment, the write mask registers 815 are 16 bits in size. As previously described, in an embodiment, the vector mask register k0 cannot he used as a write mask; when the encoding that would normally indicate k0 is used for a write mask, it selects a hardwired write mask of 0xFFFF, effectively disabling write masking for that instruction.

General-purpose registers 825 in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating—point operations on 32/64/80-bit floating point data using the x87 instruction set extension; while the MMX registers are used to perform operations on 64-bit packed integer data, as well as to hold operands for some operations performed between the MMX and XMM registers. Alternative embodiments may use wider or narrower registers. Additionally, alternative embodiments may use more, less, or different register tiles and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system. architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Figure 9:
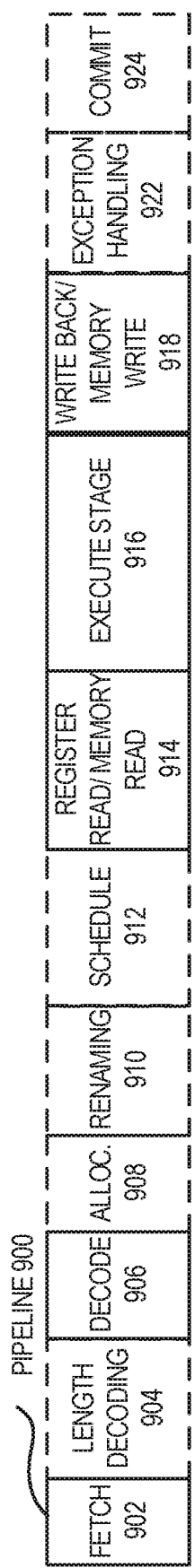
FIG. 9 is a block diagram illustrating both an example in-order pipeline and an example register renaming, out-of-order issue/execution pipeline according to various embodiments.

FIG. 9 is a block diagram illustrating both an example in-order pipeline and an example register renaming, out-of-order issue/execution pipeline according to various embodiments. The solid lined boxes in FIG, 9 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

Figure 10:
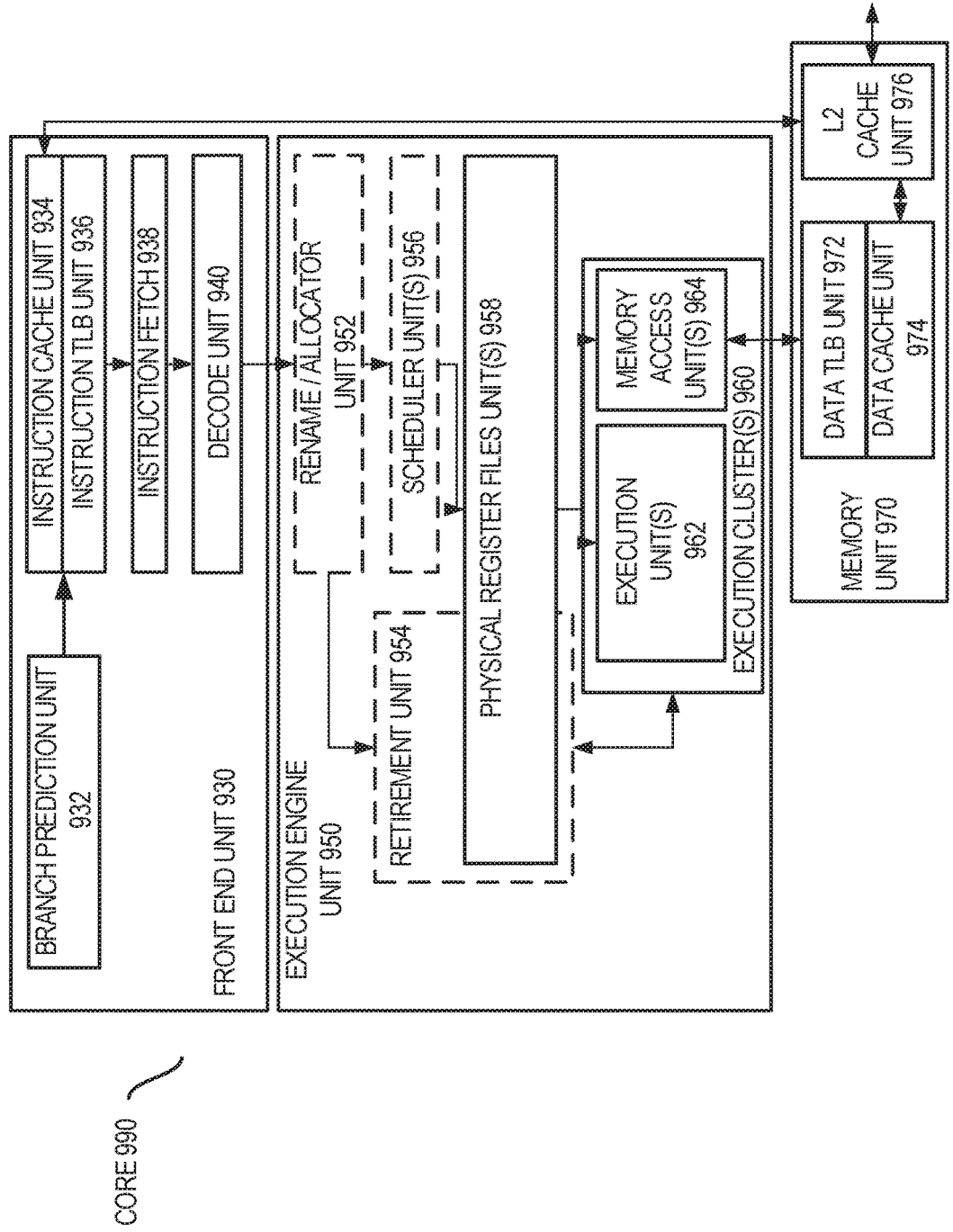
FIG. 10 is a block diagram illustrating both an example embodiment of an in-order architecture core and an example register renaming, out-of-order issue/execution architecture core to be included in a processor according to various embodiments.

FIG. 10 shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or e of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one example, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the example register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to he performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11B:
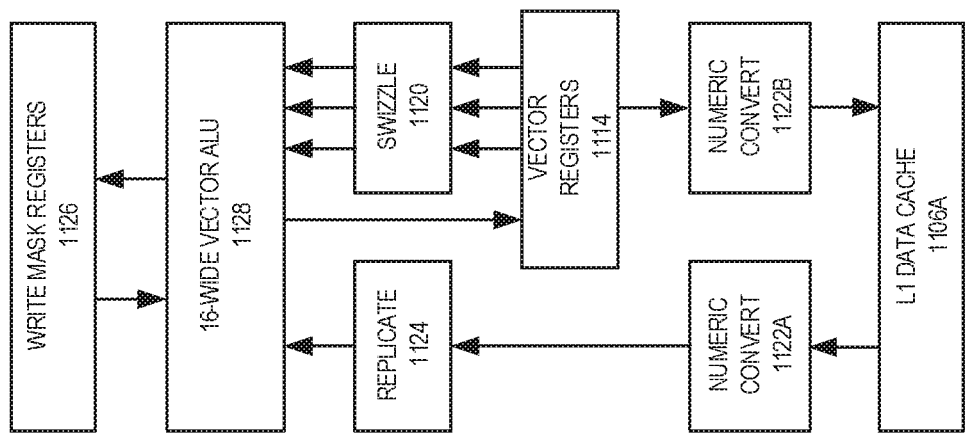
FIGS. 11A-B illustrate a block diagram of a more specific example in-order core architecture, which core would be one of several logic blocks (including other cores of the same type and/or different types) in a chip.
Figure 11A:
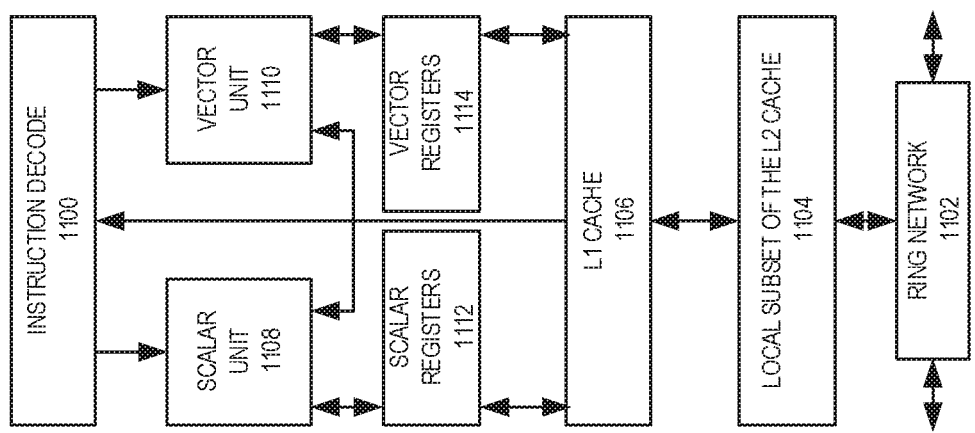

FIGS. 11A-B illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary 110 logic, depending on the application.

FIG. 11A is a block diagram of a single processor core, along with its connection to the on-die interconnect network 1102 and with its local subset of the Level 2 (L2) cache 1104, according to various embodiments. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and may be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
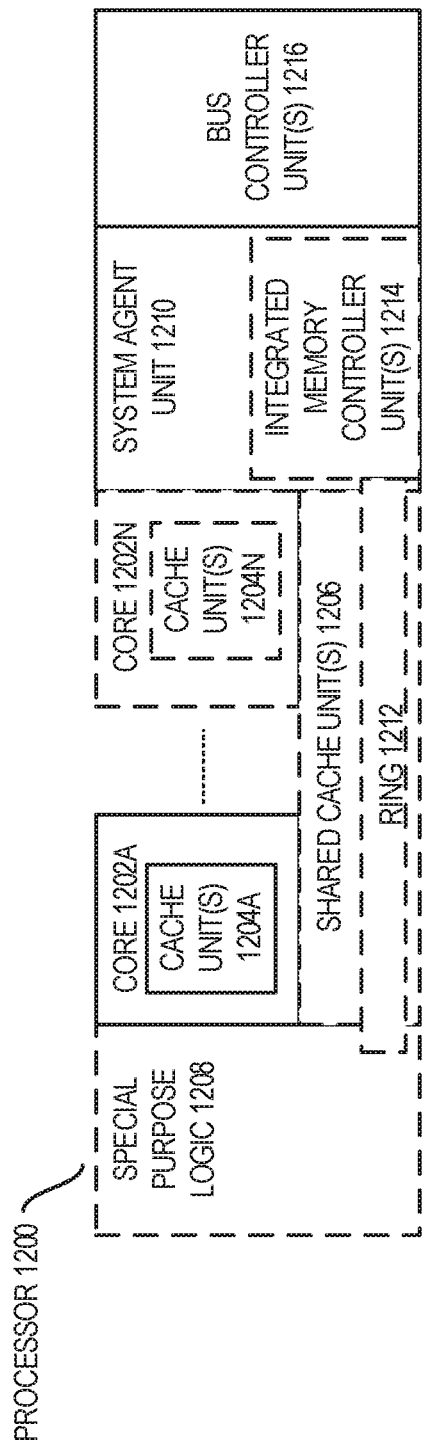
FIG. 12 is a block diagram of a processor that may have more than one core, may have an integrated memory controller, and may have integrated graphics according to various embodiments.

FIG. 12 is a block diagram of a processor 1200 that may have more than one core, may have an integrated memory controller, and may have integrated graphics according to embodiments. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

FIGS. 13-16 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
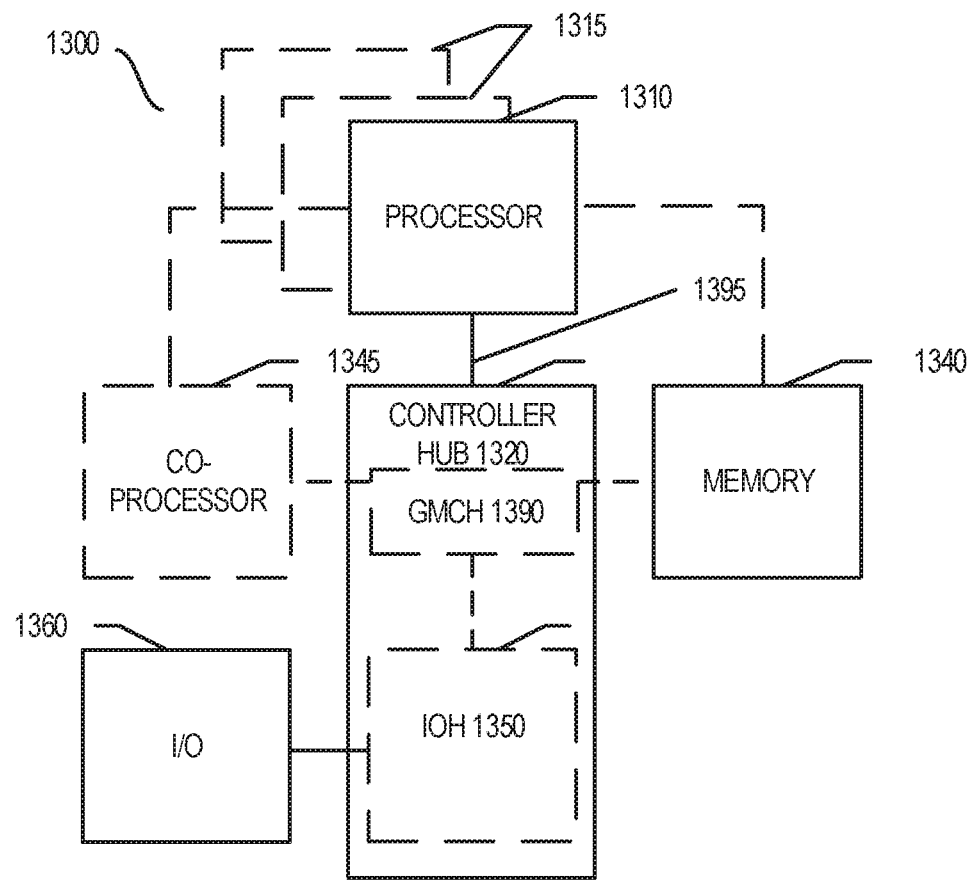
FIGS. 13-16 are block diagrams of example computer architectures.

Referring now to FIG. 13, shown is a block diagram of a system 1300 in accordance with an embodiment. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There may be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
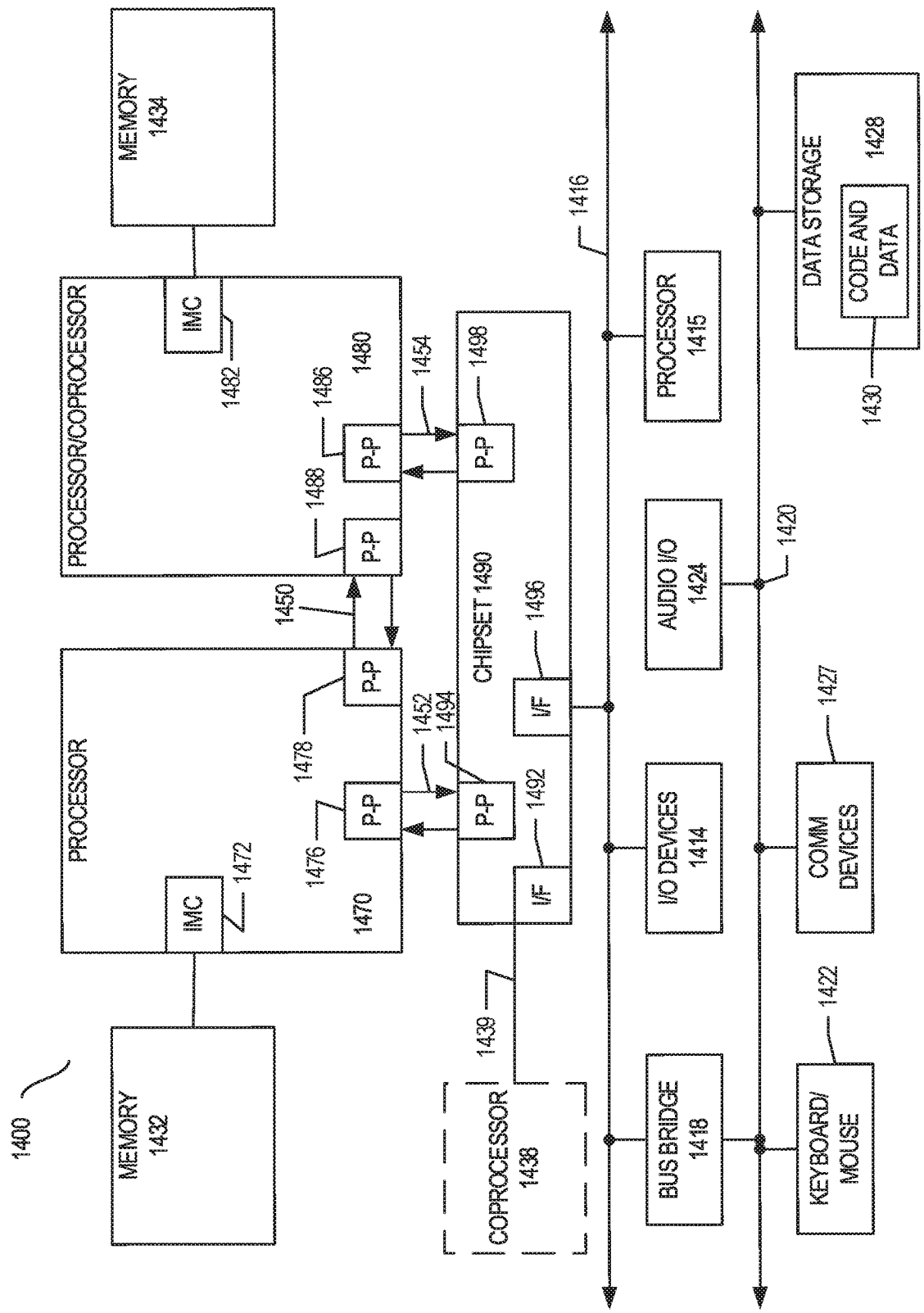

Referring now to FIG. 14, shown is a block diagram of a first more specific example system 1400 in accordance with an embodiment. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In an embodiment, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component interconnect (PCI) bus, or a bus such as a PCI Express bus or another third generation I/O interconnect bus, although the scope of the present techniques and configurations is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
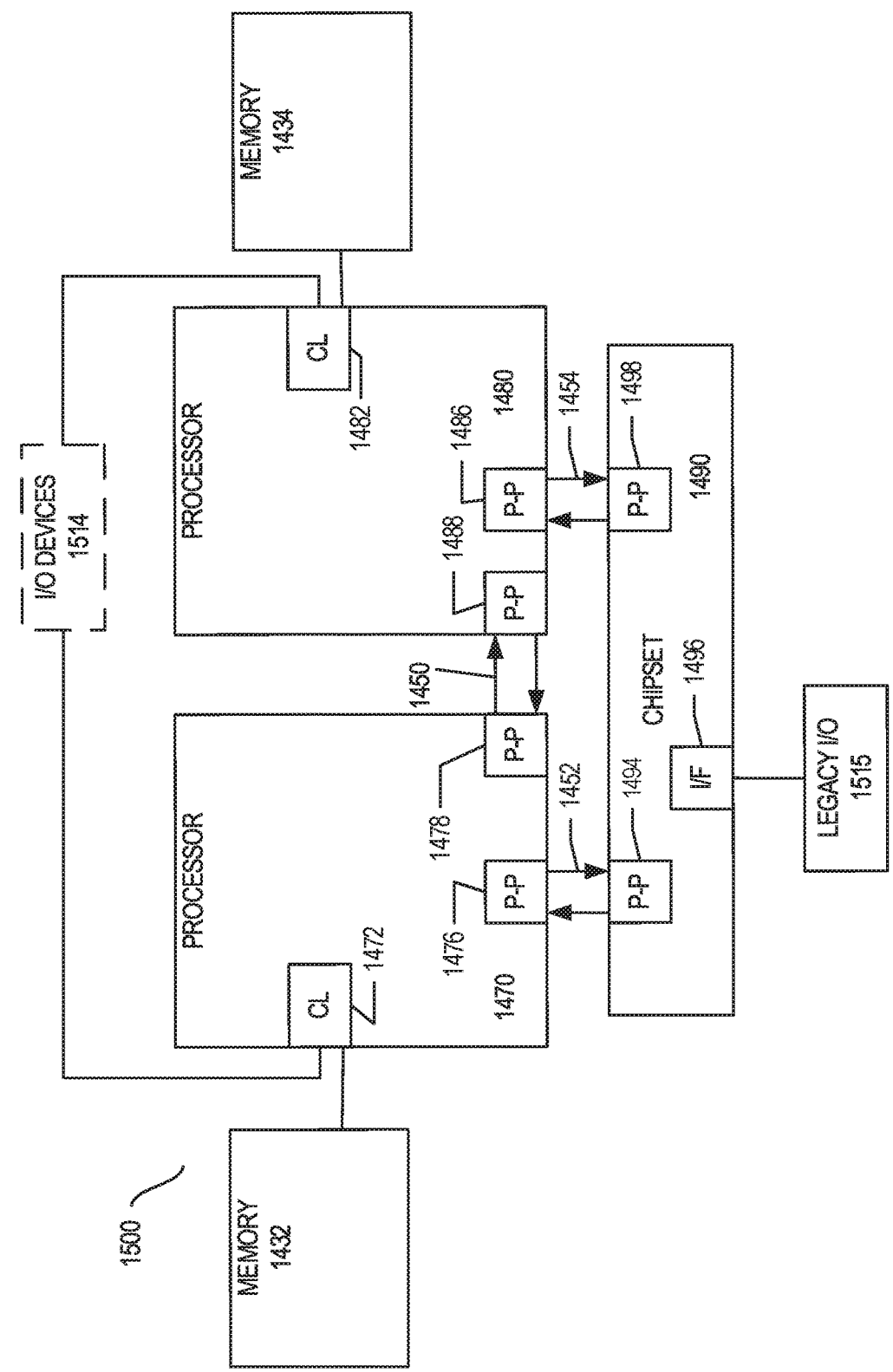

Referring now to FIG. 15, shown is a block diagram of a second more specific example system 1500 in accordance with an embodiment. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
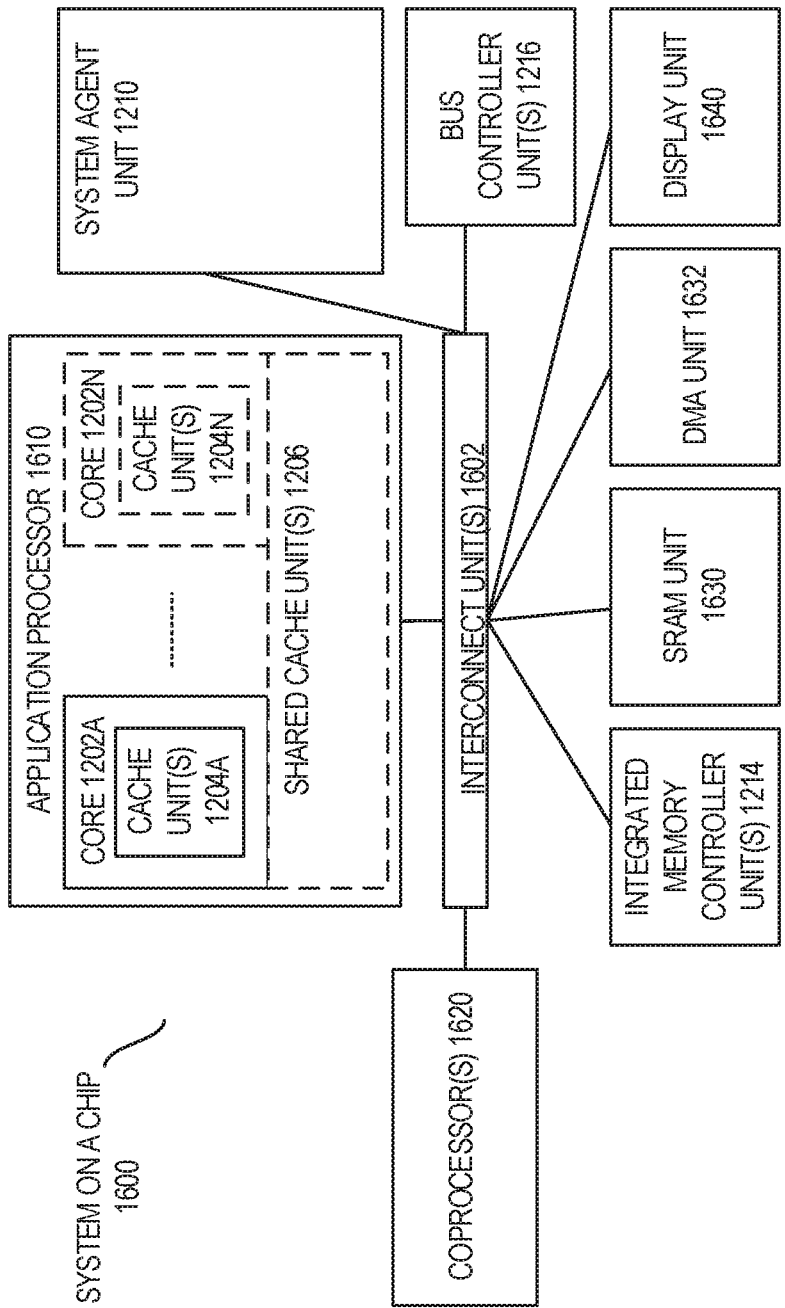

Referring now to FIG. 16, shown is a block diagram of a SoC 1600 in accordance with an embodiment. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
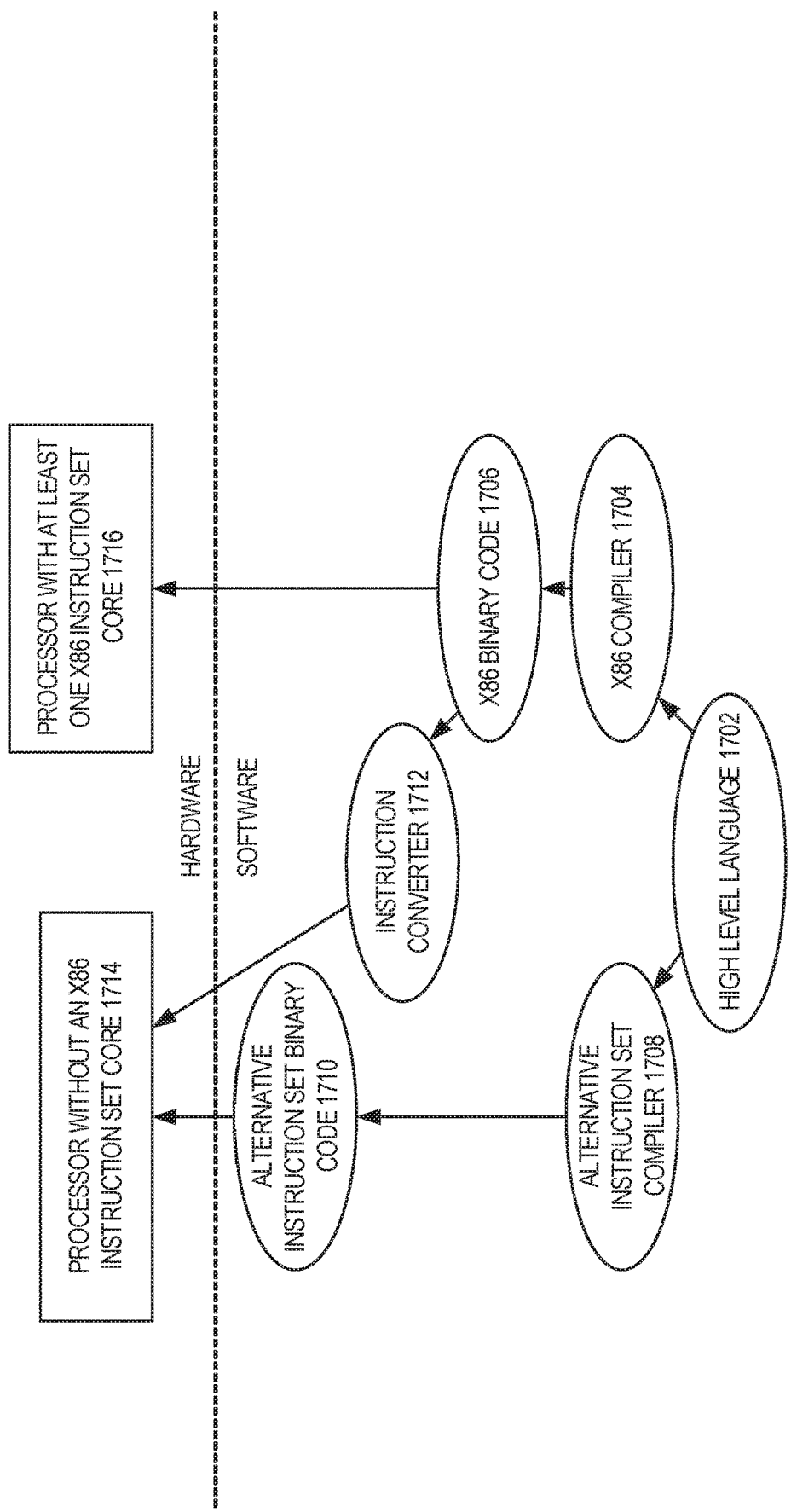
FIG. 17 is a block diagram contrasting the use of a software instruction converter to convert binary instructions in a source instruction set to binary instructions in a target instruction set according to various embodiments.

FIG. 17 is a block diagram contrasting the use of a software instruction converter to convert binary instructions in a source instruction set to binary instructions in a target instruction set according to various embodiments. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that may, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

ADDITIONAL NOTES & EXAMPLES

Example 1 is a system for processing spiking neural network operations, the system comprising: a plurality of neural processor clusters, each of the neural processor clusters to operate a plurality of neurons of a neural network, wherein each of the neural processor clusters comprises: at least one neural processor to determine respective states of the plurality of neurons; and internal memory to maintain the respective states of the plurality of neurons; a plurality of axon processors, each of the axon processors to process synapse data of a plurality of synapses in the neural network, wherein the axon processors are coupled to respective banks of external memory, and wherein each of the axon processors comprises a control unit to: retrieve synapse data of a subset of the plurality of synapses from a respective bank of the external memory; evaluate the synapse data, based on a spike message received from a presynaptic neuron of a neural processor cluster; and transmit, based on the evaluated synapse data, a weighted spike message to a postsynaptic neuron at a neural processor cluster.

In Example 2, the subject matter of Example 1 includes, the system further comprising: an interconnect (e.g., bus) to communicate spike messages, including the received and transmitted spike messages, among the plurality of neural processor clusters and the plurality of axon processors, wherein each of the plurality of neural processor clusters and each of the axon processors further comprises a network interface and a spike buffer to communicate and buffer the spike messages via the interconnect; and a plurality of memory controllers coupled to the external memory, wherein each of the memory controllers is coupled to a respective bank of the external memory, and wherein at least one of the axon processors is coupled to a respective controller of the memory controllers via the interconnect.

In Example 3, the subject matter of Example 2 includes, the external memory, the external memory comprising HBM (High Bandwidth Memory)-standard vertical stacked dynamic random-access memory (DRAM), HMC (Hybrid Memory Cube)-standard vertical stacked DRAM, stacked phase-change memory (PCM), DDR-based SDRAM, GDDR-based SDRAM, LPDDR-based SDRAM, or direct through-silicon via (TSV) die-stacked DRAM.

In Example 4, the subject matter of Examples 1-3 includes, wherein the system is a neuromorphic accelerator chip, and wherein the internal memory comprises a plurality of banks of static random access memory (SRAM) hosted within each of the neural processing clusters.

In Example 5, the subject matter of Examples 1-4 includes, wherein the external memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

In Example 6, the subject matter of Example 5 includes, wherein the target and weight pairs for respective synapses from the source neuron are stored in and retrieved from contiguous memory locations of the external memory, and wherein spike messages received from the source neuron include an identifier of the source neuron.

In Example 7, the subject matter of Examples 1-6 includes, wherein each. of the axon processors further comprises: a synaptic plasticity unit to generate updates to the synapse data, wherein the updates to the synapse data are generated from application of at least one learning rule, and wherein the updates to the synapse data include at least one of incrementing weights, decrementing weights, adding synaptic connections, or removing synaptic connections; wherein each of the axon processors are further to write the synapse data of the subset of the plurality of synapses back into the external memory, wherein the synaptic plasticity unit incorporates updates e synapse data before the synapse data is written to the external memory.

In Example 8, the subject matter of Examples 1-7 includes, wherein each of the axon processors further comprises: an address generation unit to determine, based on the received spike message, a corresponding memory address in the external memory indicating the synapse data that includes a list of synapses of the presynaptic neuron; a synapse list cache to buffer the synapse data retrieved from the external memory, wherein the synapse data corresponds to a time step of neural network processing; a synapse list decoder to parse the list from the synapse data, wherein the list includes target neuron identifiers and synaptic weights that define characteristics of each synapse from the presynaptic neuron; wherein, the control unit causes a plurality of spike messages, including the weighted spike message to the postsynaptic neuron, to be transmitted based on the target neuron identifiers and based on the synaptic weights; and wherein each of the axon processors further comprises a plurality of network interfaces and a plurality of spike buffers to communicate the plurality of spike messages with respective clusters of the plurality of neural processor clusters.

In Example 9, the subject matter of Examples 1-8 includes, wherein each of the neural processor clusters comprises: an address generation unit to determine, based on a spike message received from a respective axon processor, a corresponding memory address for a particular postsynaptic neuron tracked in the internal memory; and a control unit to: retrieve neuron state data for the particular postsynaptic neuron from the internal memory, based on the corresponding memory address; modify a potential of the particular postsynaptic neuron indicated in the neuron state data, based on the spike message received from the respective axon processor; and write the neuron state data for the particular postsynaptic neuron back to the internal memory; wherein a subsequent spike message is transmitted to one of the plurality of axon processors, in response to the potential of the particular postsynaptic neuron exceeding a spiking threshold.

Example 10 is a neural network accelerator for processing spiking neural network operations, the neural network accelerator comprising: neural processing circuitry to process of a plurality of neurons of a neural network with respective neural processor clusters, with the circuitry to: determine and maintain respective states of the plurality of neurons; and communicate spike messages within the neural network accelerator, based on the respective states; and axon processing circuitry to process synapse data of a plurality of synapses in the neural network with respective axon processors, with the circuitry to: communicate the spike messages with the neural processing circuitry; retrieve synapse data of a subset of the plurality of synapses from a bank of memory that is external to the neural network accelerator; evaluate the synapse data, based on a spike message received from a presynaptic neuron of a neural processor cluster; and transmit, based on the evaluated synapse data, a weighted spike message to a postsynaptic neuron at a neural processor cluster.

In Example 11, the subject matter of Example 10 includes, interconnect circuitry to communicate spike messages among the neural processing circuitry and the axon processing circuitry, wherein each of the neural processor clusters and each of the axon processors further comprises a network interface and a spike buffer to communicate and buffer the spike messages via the interconnect circuitry; and memory controller circuitry to host a plurality of memory controllers coupled to the memory, wherein each of the memory controllers is coupled to a respective bank of the memory, and wherein the axon processing circuitry is coupled to a respective controller of the memory controllers via the interconnect circuitry.

In Example 12, the subject matter of Example 11 includes, the external memory comprising HEM (High Bandwidth Memory)-standard vertical stacked dynamic random-access memory (DRAM), HMC (Hybrid Memory Cube)-standard vertical stacked DRAM, or stacked phase-change memory (PCM), DDR-based SDRAM, GDDR-based SDRAM, LPDDR-based SDRAM, or direct through-silicon via (TSV) die-stacked DRAM.

In Example 13, the subject matter of Examples 10-12 includes, internal memory arranged in the neural processing circuitry, wherein the internal memory comprises a plurality of banks of static random access memory (SRAM) located among a plurality of neural processing clusters of the neural processing circuitry.

In Example 14, the subject matter of Examples 10-13 includes, wherein the memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

In Example 15, the subject matter of Example 14 includes, wherein the target and weight pairs for respective synapses from the source neuron are stored in and retrieved from contiguous memory locations of the memory, and wherein spike messages received from the source neuron include an identifier of the source neuron.

In Example 16, the subject matter of Examples 10-15 includes, wherein the axon processing circuitry further comprises: synaptic plasticity circuitry to generate updates to the synapse data, wherein the updates to the synapse data are generated from application of at least one learning rule, and wherein the updates to the synapse data include at least one of: incrementing weights, decrementing weights, adding synaptic connections, or removing synaptic connections; wherein the axon processing circuitry is further to write the synapse data of the subset of the plurality of synapses back into the memory, wherein updates to the synapse data are incorporated before the synapse data is written to the memory.

In Example 17, the subject matter of Examples 10-16 includes, wherein the axon processing circuitry further comprises: address generation circuitry to determine, based on the received spike message, a corresponding memory address in the memory indicating the synapse data that includes a list of synapses of the presynaptic neuron; a synapse list buffer to buffer the synapse data retrieved from the memory, wherein the synapse data corresponds to a time step of neural network processing; synapse list decoding circuitry to parse the list from the synapse data, wherein the list includes target neuron identifiers and synaptic weights that define characteristics of each synapse from the presynaptic neuron; wherein, the axon processing circuitry causes a plurality of spike messages, including the weighted spike message to the postsynaptic neuron, to be transmitted based on the target neuron identifiers and based on the synaptic weights; and wherein the axon processing circuitry further comprises a plurality of network interfaces and a plurality of spike buffers to communicate the plurality of spike messages with respective clusters of the plurality of neural processor clusters.

In Example 18, the subject matter of Examples 10-17 includes, wherein the neural processing circuitry further comprises: address generation circuitry to determine, based on a spike message received from a respective axon processor, a corresponding memory address for a particular postsynaptic neuron tracked in an internal memory; wherein the neural processing circuitry is further to: retrieve neuron state data for the particular postsynaptic neuron from a memory, based on the corresponding memory address; modify a potential of the particular postsynaptic neuron indicated in the neuron state data, based on the spike message received from the axon processing circuitry; and write the neuron state data for the particular postsynaptic neuron back to the memory; wherein a subsequent spike message is transmitted to the axon processing circuitry, in response to the potential of the particular postsynaptic neuron exceeding a spiking threshold.

Example 19 is at least one machine readable medium including instructions for processing spiking neural network operations, wherein the instructions, when executed, configure neuromorphic processing circuitry to perform operations comprising: configuring a plurality of neural processor clusters, each of the neural processor clusters to operate a plurality of neurons of a neural network, with the neural processor clusters configured to: determine and maintain respective states of the plurality of neurons; and communicate spike messages within the neuromorphic processing circuitry, based on the respective states; and configuring a plurality of axon processors, each of the axon processors being coupled to respective banks of external memory, and each of the axon processors to process synapse data of a plurality of synapses in the neural network, with the axon processors configured to: retrieve synapse data of a subset of the plurality of synapses from a bank of memory, the memory being external to the neuromorphic processing circuitry; evaluate the synapse data, based on a spike message received from a presynaptic neuron of a neural processor cluster; and transmit, based on the evaluated synapse data, a weighted spike message to a postsynaptic neuron at a neural processor cluster.

In Example 20, the subject matter of Example 19 includes, the operations further comprising: configuring an interconnect to communicate spike messages among the plurality of neural processor clusters and the plurality of axon processors; wherein a plurality of memory controllers are coupled to the external memory, wherein each of the memory controllers is coupled to a respective bank of the external memory, and wherein at least one of the axon processors is coupled to a respective controller of the memory controllers via the interconnect.

In Example 21, the subject matter of Examples 19-20 includes, wherein the external memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

In Example 22, the subject matter of Example 21 includes, wherein the target and weight pairs for respective synapses from the source neuron are stored in and retrieved from contiguous memory locations of the external memory, and wherein spike messages received from the source neuron include an identifier of the source neuron.

In Example 23, the subject matter of Examples 19-22 includes, wherein each of the axon processors are further configured to: generate updates to the synapse data, wherein the updates to the synapse data are generated from application of at least one learning rule, and wherein the updates to the synapse data include at least one of: incrementing weights, decrementing weights, adding synaptic connections, or removing synaptic connections; wherein each of the axon processors are further configured to write the synapse data of the subset of the plurality of synapses back into the external memory, wherein the updates to the synapse data are incorporated before the synapse data is written to the external memory.

In Example 24, the subject matter of Examples 19-23 includes, wherein each of the axon processors are further configured to: determine, based on the received spike message, a corresponding memory address in the external memory indicating the synapse data that includes a list of synapses of the presynaptic neuron; buffer the synapse data retrieved from the external memory, wherein the synapse data corresponds to a time step of neural network processing; parse the list from the synapse data, wherein the list includes target neuron identifiers and synaptic weights that define characteristics of each synapse from the presynaptic neuron; wherein, a plurality of spike messages, including the weighted spike message to the postsynaptic neuron, are transmitted based on the target neuron identifiers and based on the synaptic weights; and wherein each of the axon processors further comprises a plurality of network interfaces and a plurality of spike buffers to communicate the plurality of spike messages with respective clusters of the plurality of neural processor clusters.

In Example 25, the subject matter of Examples 19-24 includes, wherein each of the neural processor clusters is configured to: determine, based on a spike message received from a respective axon processor, a corresponding memory address for a particular postsynaptic neuron tracked in an internal memory of the neuromorphic processing circuitry; retrieve neuron state data for the particular postsynaptic neuron from the internal memory, based on the corresponding memory address; modify a potential of the particular postsynaptic neuron indicated in the neuron state data, based on the spike message received from the respective axon processor; and write the neuron state data for the particular postsynaptic neuron back to the internal memory; wherein a subsequent spike message is transmitted to one of the plurality of axon processors, in response to the potential of the particular postsynaptic neuron exceeding a spiking threshold.

In Example 26, the subject matter of Examples 19-25 includes, the external memory comprising HBM (High Bandwidth Memory)-standard vertical stacked dynamic random-access memory (DRAM), HMC (Hybrid Memory Cube)-standard vertical stacked DRAM, or stacked phase-change memory (PCM), DDR-based SDRAM, GDDR-based SDRAM, LPDDR-based SDRAM, or direct through-silicon via (TSV) die-stacked DRAM.

In Example 27, the subject matter of Examples 19-26 includes, wherein each of the neural processor clusters comprises internal memory arranged within the neuromorphic processing circuitry, wherein the internal memory comprises a plurality of banks of static random access memory (SRAM).

Example 28 is a method for processing spiking neural network operations, comprising operations performed using neuromorphic processing circuitry, the operations comprising: determining and maintaining respective states of a plurality of neurons with a neural processor cluster of a plurality of neural processor clusters, each of the neural processor clusters to operate a plurality of neurons of a neural network; and communicating spike messages from the neural processor cluster within the neuromorphic processing circuitry, based on the respective states; retrieving synapse data of a subset of a plurality of synapses from a bank of memory, using an axon processor of a plurality of axon processors, each of the axon processors being coupled to respective banks of external memory, and each of the axon processors to process synapse data of a plurality of synapses in the neural network, wherein the memory is external to the neuromorphic processing circuitry; evaluating the synapse data, based on a spike message received from a presynaptic neuron of the neural processor cluster; and transmitting, based on the evaluated synapse data, a weighted spike message to a postsynaptic neuron at a neural processor cluster of the plurality of neural processor clusters.

In Example 29, the subject matter of Example 28 includes: communicating spike messages among the plurality of neural processor clusters and the plurality of axon processors with an interconnect; wherein a plurality of memory controllers are coupled to the external memory, wherein each of the memory controllers is coupled to a respective bank of the external memory, and wherein at least one of the axon processors is coupled to a respective controller of the memory controllers via the interconnect.

In Example 30, the subject matter of Examples 28-29 includes, wherein the external memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

In Example 31, the subject matter of Example 30 includes, wherein the target and weight pairs for respective synapses from the source neuron are stored in and retrieved from contiguous memory locations of the external memory, and wherein spike messages received from the source neuron include an identifier of the source neuron.

In Example 32, the subject matter of Examples 28-31 includes, wherein each of the axon processors further perform operations comprising: generating updates to the synapse data, wherein the updates to the synapse data are generated from application of at least one learning rule, and wherein the updates to the synapse data include at least one of: incrementing weights, decrementing weights, adding synaptic connections, or removing synaptic connections; wherein each of the axon processors further write the synapse data of the subset of the plurality of synapses back into the external memory, wherein the updates to the synapse data are incorporated before the synapse data is written to the external memory.

In Example 33, the subject matter of Examples 28-32 includes, wherein each of the axon processors further perform operations comprising: determining, based on the received spike message, a corresponding memory address in the external memory indicating the synapse data that includes a list of synapses of the presynaptic neuron; buffering the synapse data retrieved from the external memory, wherein the synapse data corresponds to a time step of neural network processing; parsing the list from the synapse data, wherein the list includes target neuron identifiers and synaptic weights that define characteristics of each synapse from the presynaptic neuron; wherein, a plurality of spike messages, including the weighted spike message to the postsynaptic neuron, are transmitted based on the target neuron identifiers and based on the synaptic weights; and wherein each of the axon processors further comprises a plurality of network interfaces and a plurality of spike buffers to communicate the plurality of spike messages with respective clusters of the plurality of neural processor clusters.

In Example 34, the subject matter of Examples 28-33 includes, wherein each of the neural processor clusters further perform operations comprising: determining, based on a spike message received from a respective axon processor, a corresponding memory address for a particular postsynaptic neuron tracked in an internal memory of the neuromorphic processing circuitry; retrieving neuron state data for the particular postsynaptic neuron from the internal memory, based on the corresponding memory address; modifying a potential of the particular postsynaptic neuron indicated in the neuron state data, based on the spike message received from the respective axon processor; and writing the neuron state data for the particular postsynaptic neuron back to the internal memory; wherein a subsequent spike message is transmitted to one of the plurality of axon processors, in response to the potential of the particular postsynaptic neuron exceeding a spiking threshold.

In Example 35, the subject matter of Examples 28-34 includes, the external memory comprising HBM (High Bandwidth Memory)-standard vertical stacked dynamic random-access memory (DRAM), HMC (Hybrid Memory Cube)-standard vertical stacked DRAM, or stacked phase-change memory (PCM), DDR-based SDRAM, GDDR-based SDRAM, LPDDR-based SDRAM, or direct through-silicon via (TSV) die-stacked DRAM.

In Example 36, the subject matter of Examples 28-35 includes, wherein each of the neural processor clusters comprises internal memory arranged within the neuromorphic processing circuitry, wherein the internal memory comprises a plurality of banks of static random access memory (SRAM).

Example 37 is a method, comprising providing the neuromorphic processing circuitry to perform any of the methods of Examples 28-36.

Example 38 is a method, comprising configuring the neuromorphic processing circuitry to perform any of the methods of Examples 28-36.

Example 39 is at least one machine readable medium including instructions, which when executed by a computing system, cause the neuromorphic processing circuitry to perform or implement any of the methods of Examples 28-36.

Example 40 is an apparatus comprising means for performing any of the methods of Examples 28-36.

Example 41 is an apparatus, comprising: means for determining and maintaining respective states of a plurality of neurons with a neural processor cluster of a plurality of neural processor clusters, each of the neural processor clusters to operate a plurality of neurons of a neural network; and means for communicating spike messages from the neural processor cluster within the apparatus, based on the respective states; means for retrieving synapse data of a subset of a plurality of synapses from a bank of memory, using an axon processor of a plurality of axon processors, each of the axon processors being coupled to respective banks of external memory, and each of the axon processors to process synapse data of a plurality of synapses in the neural network, wherein the memory is external to the apparatus; means for evaluating the synapse data, based on a spike message received from a presynaptic neuron of the neural processor cluster; and means for transmitting, based on the evaluated synapse data, a weighted spike message to a postsynaptic neuron at a neural processor cluster of the plurality of neural processor clusters.

In Example 42, the subject matter of Example 41 includes, means for communicating spike messages among the plurality of neural processor clusters and. the plurality of axon processors; wherein a plurality of memory controllers are coupled to the external memory, wherein each of the memory controllers is coupled to a respective hank of the external memory, and wherein at least one of the axon processors is coupled to a respective controller of the memory controllers via the means for communicating.

In Example 43, the subject matter of Examples 41-42 includes, means for storing the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

In Example 44, the subject matter of Example 43 includes, means for storing and retrieving the target and weight pairs for respective synapses from the source neuron are stored in and retrieved from contiguous memory locations, wherein spike messages received from the source neuron include an identifier of the source neuron.

In Example 45, the subject matter of Examples 41-44 includes, means for generating updates to the synapse data, wherein the updates to the synapse data are generated from application of at least one learning rule, and wherein the updates to the synapse data include at least one of: incrementing weights, decrementing weights, adding synaptic connections, or removing synaptic connections; means for further writing the synapse data of the subset of the plurality of synapses back into the external memory, wherein the updates to the synapse data are incorporated before the synapse data is written to the external memory.

In Example 46, the subject matter of Examples 41-45 includes, means for determining, based on the received spike message, a corresponding memory address in the external memory indicating the synapse data that includes a list of synapses of the presynaptic neuron; means for buffering the synapse data retrieved from the external memory, wherein the synapse data corresponds to a time step of neural network processing; means for parsing the list from the synapse data, wherein the list includes target neuron identifiers and synaptic weights that define characteristics of each synapse from the presynaptic neuron; wherein, a plurality of spike messages, including the weighted spike message to the postsynaptic neuron, are transmitted based on the target neuron identifiers and based on the synaptic weights; and wherein each of the axon processors further comprises a plurality of network interfaces and a plurality of spike buffers to communicate the plurality of spike messages with respective clusters of the plurality of neural processor clusters.

In Example 47, the subject matter of Examples 41-46 includes, means for determining, based on a spike message received from a respective axon processor, a corresponding memory address for a particular postsynaptic neuron tracked in an internal memory of the apparatus; means for retrieving neuron state data for the particular postsynaptic neuron from the internal memory, based on the corresponding memory address; means for modifying a potential of the particular postsynaptic neuron indicated in the neuron state data, based on the spike message received from the respective axon processor; and means for writing the neuron state data for the particular postsynaptic neuron back to the internal memory; wherein a subsequent spike message is transmitted to one of the plurality of axon processors, in response to the potential of the particular postsynaptic neuron exceeding a spiking threshold.

Example 48 is a system to perform the operations of any of the Examples 1-47.

Example 49 is a method to perform the operations of any of the Examples 1-47.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not he interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for processing spiking neural network operations, the system comprising:
    a plurality of neural processor clusters, each of the neural processor clusters to operate a plurality of neurons of a neural network, wherein each of the neural processor clusters comprises:
        at least one neural processor to determine respective states of the plurality of neurons;

internal memory to maintain the respective states of the plurality of neurons;

an address generation unit to determine, based on a spike message received from a respective axon processor, a corresponding memory address for a particular postsynaptic neuron tracked in the internal memory; and a control unit to:
retrieve neuron state data for the particular postsynaptic neuron from the internal memory, based on the corresponding memory address;
modify a potential of the particular postsynaptic neuron indicated in the neuron state data, based on the spike message received from the respective axon processor; and
write the neuron state data for the particular postsynaptic neuron back to the internal memory;

a plurality of axon processors, each of the axon processors to process synapse data of a plurality of synapses in the neural network, wherein the axon processors are coupled to respective banks of external memory, and wherein each of the axon processors comprises a control unit to:
retrieve synapse data of a subset of the plurality of synapses from a respective bank of the external memory;
evaluate the synapse data, based on a spike message received from a presynaptic neuron of a neural processor cluster; and
transmit, based on the evaluated synapse data, a weighted spike message to a postsynaptic neuron at a neural processor cluster.

2. The system of claim 1, the system further comprising:
an interconnect to communicate spike messages, including the received and transmitted spike messages, among the plurality of neural processor clusters and the plurality of axon processors, wherein each of the plurality of neural processor clusters and each of the axon processors further comprises a network interface and a spike buffer to communicate and buffer the spike messages via the interconnect; and
a plurality of memory controllers coupled to the external memory, wherein each of the memory controllers is coupled to a respective bank of the external memory, and wherein at least one of the axon processors is coupled to a respective controller of the memory controllers via the interconnect.

3. The system of claim 2, further comprising the external memory, wherein the external memory comprises HBM (High Bandwidth Memory)-standard vertical stacked dynamic random-access memory (DRAM), HMC (Hybrid Memory Cube)-standard vertical stacked DRAM, or stacked phase-change memory (PCM).

4. The system of claim 1, wherein the system is a neuromorphic accelerator chip, and wherein the internal memory comprises a plurality of banks of static random access memory (SRAM) hosted within each of the neural processing clusters.

5. The system of claim 1, wherein the external memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

6. The system of claim 5, wherein the target and weight pairs for respective synapses from the source neuron are stored in and retrieved from contiguous memory locations of the external memory, and wherein spike messages received from the source neuron include an identifier of the source neuron.

7. The system of claim 1, wherein each of the axon processors further comprises:
a synaptic plasticity unit to generate updates to the synapse data, wherein the updates to the synapse data are generated from application of at least one learning rule, and wherein the updates to the synapse data include at least one of: incrementing weights, decrementing weights, adding synaptic connections, or removing synaptic connections;
wherein each of the axon processors are further to write the synapse data of the subset of the plurality of synapses back into the external memory, wherein the synaptic plasticity unit incorporates updates to the synapse data before the synapse data is written to the external memory.

8. The system of claim 1, wherein each of the axon processors further comprises:
an address generation unit to determine, based on the received spike message, a corresponding memory address in the external memory indicating the synapse data that includes a list of synapses of the presynaptic neuron;
a synapse list cache to buffer the synapse data retrieved from the external memory, wherein the synapse data corresponds to a time step of neural network processing;
a synapse list decoder to parse the list from the synapse data, wherein the list includes target neuron identifiers and synaptic weights that define characteristics of each synapse from the presynaptic neuron;
wherein, the control unit causes a plurality of spike messages, including the weighted spike message to the postsynaptic neuron, to be transmitted based on the target neuron identifiers and based on the synaptic weights; and
wherein each of the axon processors further comprises a plurality of network interfaces and a plurality of spike buffers to communicate the plurality of spike messages with respective clusters of the plurality of neural processor clusters.

9. The system of claim 1,
wherein a subsequent spike message is transmitted to one of the plurality of axon processors, in response to the potential of the particular postsynaptic neuron exceeding a spiking threshold.

10. A neural network accelerator for processing spiking neural network operations, the neural network accelerator comprising:
neural processing circuitry to process of a plurality of neurons of a neural network with respective neural processor clusters, wherein the neural processing circuitry includes:
address generation circuitry to determine, based on the received spike message, a corresponding memory address in a memory indicating the synapse data that includes a list of synapses of the presynaptic neuron;
wherein the the neural processing circuitry is to:
determine and maintain respective states of the plurality of neurons;
communicate spike messages within the neural network accelerator, based on the respective states;

retrieve neuron state data for the particular postsynaptic neuron from the memory, based on the corresponding memory address;

modify a potential of the particular postsynaptic neuron indicated in the neuron state data, based on the spike message received from the axon processing circuitry; and write the neuron state data for the particular postsynaptic neuron back to the memory; and axon processing circuitry to process synapse data of a plurality of synapses in the neural network with respective axon processors, with the circuitry to:

communicate the spike messages with the neural processing circuitry;

retrieve synapse data of a subset of the plurality of synapses from a bank of the memory that is external to the neural network accelerator;

evaluate the synapse data, based on a spike message received from a presynaptic neuron of a neural processor cluster; and transmit, based on the evaluated synapse data, a weighted spike message to a postsynaptic neuron at a neural processor cluster.

11. The neural network accelerator of claim 10, further comprising:

interconnect circuitry to communicate spike messages among the neural processing circuitry and the axon processing circuitry, wherein each of the neural processor clusters and each of the axon processors further comprises a network interface and a spike buffer to communicate and buffer the spike messages via the interconnect circuitry; and memory controller circuitry to host a plurality of memory controllers coupled to the memory, wherein each of the memory controllers is coupled to a respective bank of the memory, and wherein the axon processing circuitry is coupled to a respective controller of the memory controllers via the interconnect circuitry.

12. The neural network accelerator of claim 11, wherein the memory comprises HBM (High Bandwidth Memory)-standard vertical stacked dynamic random-access memory (DRAM), HMC (Hybrid Memory Cube)-standard vertical stacked DRAM, or stacked phase-change memory (PCM).

13. The neural network accelerator of claim 10, further comprising internal memory arranged in the neural processing circuitry, wherein the internal memory comprises a plurality of banks of static random access memory (SRAM) located among a plurality of neural processing clusters of the neural processing circuitry.

14. The neural network accelerator of claim 10, wherein the memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

15. The neural network accelerator of claim 14, wherein the target and weight pairs for respective synapses from the source neuron are stored in and retrieved from contiguous memory locations of the memory, and wherein spike messages received from the source neuron include an identifier of the source neuron.

16. The neural network accelerator of claim 10, wherein the axon processing circuitry further comprises:

synaptic plasticity circuitry to generate updates to the synapse data, wherein the updates to the synapse data are generated from application of at least one learning rule, and wherein the updates to the synapse data include at least one of: incrementing weights, decrementing weights, adding synaptic connections, or removing synaptic connections;

wherein the axon processing circuitry is further to write the synapse data of the subset of the plurality of synapses back into the memory, wherein updates to the synapse data are incorporated before the synapse data is written to the memory.

17. The neural network accelerator of claim 10, wherein the axon processing circuitry further comprises:

address generation circuitry to determine, based on the received spike message, a corresponding memory address in the memory indicating the synapse data that includes a list of synapses of the presynaptic neuron;

a synapse list buffer to buffer the synapse data retrieved from the memory, wherein the synapse data corresponds to a time step of neural network processing;

synapse list decoding circuitry to parse the list from the synapse data, wherein the list includes target neuron identifiers and synaptic weights that define characteristics of each synapse from the presynaptic neuron;

wherein, the axon processing circuitry causes a plurality of spike messages, including the weighted spike message to the postsynaptic neuron, to be transmitted based on the target neuron identifiers and based on the synaptic weights; and wherein the axon processing circuitry further comprises a plurality of network interfaces and a plurality of spike buffers to communicate the plurality of spike messages with respective clusters of the plurality of neural processor clusters.

18. The neural network accelerator of claim 10, wherein a subsequent spike message is transmitted to the axon processing circuitry, in response to the potential of the particular postsynaptic neuron exceeding a spiking threshold.

19. At least one non-transitory machine readable medium including instructions for processing spiking neural network operations, wherein the instructions, when executed, configure neuromorphic processing circuitry to perform operations comprising:

configuring a plurality of neural processor clusters, each of the neural processor clusters:

including address generation circuitry to determine, based on the received spike message, a corresponding memory address in an internal memory indicating the synapse data that includes a list of synapses of the presynaptic neuron; and to operate a plurality of neurons of a neural network, with the neural processor clusters configured to:

determine and maintain respective states of the plurality of neurons; and communicate spike messages within the neuromorphic processing circuitry, based on the respective states;

determine, based on a spike message received from a respective axon processor, a corresponding memory address for a particular postsynaptic neuron tracked in the internal memory of the neuromorphic processing circuitry;

retrieve neuron state data for the particular postsynaptic neuron from the internal memory, based on the corresponding memory address;

modify a potential of the particular postsynaptic neuron indicated in the neuron state data, based on the spike message received from the respective axon processor; and write the neuron state data for the particular postsynaptic neuron back to the internal memory; and configuring a plurality of axon processors, each of the axon processors being coupled to respective banks of external memory, and each of the axon processors to process synapse data of a plurality of synapses in the neural network, with the axon processors configured to:

retrieve synapse data of a subset of the plurality of synapses from a bank of memory, the memory being external to the neuromorphic processing circuitry;

evaluate the synapse data, based on a spike message received from a presynaptic neuron of a neural processor cluster; and transmit, based on the evaluated synapse data, a weighted spike message to a postsynaptic neuron at a neural processor cluster.

20. The at least one non-transitory machine readable medium of claim 19, the operations further comprising:

configuring an interconnect to communicate spike messages among the plurality of neural processor clusters and the plurality of axon processors;

wherein a plurality of memory controllers are coupled to the external memory, wherein each of the memory controllers is coupled to a respective bank of the external memory, and wherein at least one of the axon processors is coupled to a respective controller of the memory controllers via the interconnect.

21. The at least one non-transitory machine readable medium of claim 19, wherein the external memory stores the synapse data for respective synapses connecting the plurality of neurons in the neural network, wherein the synapse data includes target and weight pairs for each of the respective synapses, wherein each respective target identifies a target neuron and each respective weight identifies a weighted connection of a particular synapse from a source neuron to the target neuron.

22. The at least one non-transitory machine readable medium of claim 21, wherein the target and weight pairs for respective synapses from the source neuron are stored in and retrieved from contiguous memory locations of the external memory, and wherein spike messages received from the source neuron include an identifier of the source neuron.

23. The at least one non-transitory machine readable medium of claim 19, wherein each of the axon processors are further configured to:

generate updates to the synapse data, wherein the updates to the synapse data are generated from application of at least one learning rule, and wherein the updates to the synapse data include at least one of: incrementing weights, decrementing weights, adding synaptic connections, or removing synaptic connections;

wherein each of the axon processors are further configured to write the synapse data of the subset of the plurality of synapses back into the external memory, wherein the updates to the synapse data are incorporated before the synapse data is written to the external memory.

24. The at least one non-transitory machine readable medium of claim 19, wherein each of the axon processors are further configured to:

determine, based on the received spike message, a corresponding memory address in the external memory indicating the synapse data that includes a list of synapses of the presynaptic neuron;

buffer the synapse data retrieved from the external memory, wherein the synapse data corresponds to a time step of neural network processing;

parse the list from the synapse data, wherein the list includes target neuron identifiers and synaptic weights that define characteristics of each synapse from the presynaptic neuron;

wherein, a plurality of spike messages, including the weighted spike message to the postsynaptic neuron, are transmitted based on the target neuron identifiers and based on the synaptic weights; and wherein each of the axon processors further comprises a plurality of network interfaces and a plurality of spike buffers to communicate the plurality of spike messages with respective clusters of the plurality of neural processor clusters.

25. The at least one non-transitory machine readable medium of claim 19, wherein a subsequent spike message is transmitted to one of the plurality of axon processors, in response to the potential of the particular postsynaptic neuron exceeding a spiking threshold.

* * * * *